US009262342B2

(12) United States Patent
Diep et al.

(10) Patent No.: US 9,262,342 B2
(45) Date of Patent: Feb. 16, 2016

(54) PROCESS AUTHENTICATED MEMORY PAGE ENCRYPTION

(71) Applicant: RAMBUS INC., Sunnyvale, CA (US)

(72) Inventors: Trung Am Diep, San Jose, CA (US); Pradeep Batra, Santa Clara, CA (US); Brian S. Leibowitz, San Francisco, CA (US); Frederick A. Ware, Los Altos Hills, CA (US)

(73) Assignee: Rambus Inc., Sunnyvale, CA (US)

( * ) Notice: Subject to any disclaimer, the term of this patent is extended or adjusted under 35 U.S.C. 154(b) by 6 days.

(21) Appl. No.: 14/133,383

(22) Filed: Dec. 18, 2013

(65) Prior Publication Data

US 2014/0237261 A1    Aug. 21, 2014

Related U.S. Application Data

(60) Provisional application No. 61/740,367, filed on Dec. 20, 2012.

(51) Int. Cl.
G06F 12/00    (2006.01)
G06F 12/14    (2006.01)
G06F 21/79    (2013.01)
G06F 12/10    (2006.01)

(52) U.S. Cl.
CPC ............ *G06F 12/1408* (2013.01); *G06F 21/79* (2013.01); *G06F 12/1009* (2013.01); *G06F 2212/1052* (2013.01); *G06F 2221/2107* (2013.01)

(58) Field of Classification Search
USPC .................................................. 713/189–194
See application file for complete search history.

(56) References Cited

U.S. PATENT DOCUMENTS

| 5,825,879 | A  | * | 10/1998 | Davis ............................ 380/216 |
| 8,005,211 | B2 |   | 8/2011  | Furukawa |
| 8,041,032 | B2 |   | 10/2011 | Katoozi et al. |
| 2008/0240421 | A1 | * | 10/2008 | Gopal et al. .................... 380/28 |

OTHER PUBLICATIONS

Rogers et al., "Using Address Independent Seed Encryption and Bonsai Merkle Trees to Make Secure Processors OS- and Performance-Friendly," Proceedings of the 40th Annual IEEE/ACM International Symposium on Microarchitecture (MICRO), Dec. 2007. 12 pages.

* cited by examiner

*Primary Examiner* — Ghazal Shehni
(74) *Attorney, Agent, or Firm* — Silicon Edge Law Group LLP; Arthur J. Behiel

(57) ABSTRACT

A memory controller encrypts contents of a page frame based at least in part on a frame key associated with the page frame. The memory controller generates a first encrypted version of the frame key based at least in part on a first process key associated with a first process, wherein the first encrypted version of the frame key is stored in a first memory table associated with the first process. The memory controller generates a second encrypted version of the frame key based at least in part on a second process key associated with a second process, wherein the second encrypted version of the frame key is stored in a second memory table associated with the second process, the first process and the second process sharing access to the page frame using the first encrypted version of the frame key and the second encrypted version of the frame key, respectively.

19 Claims, 20 Drawing Sheets

PROCESS AUTHENTICATED MEMORY PAGE ENCRYPTION

RELATED APPLICATIONS

This patent application claims the benefit under 35 U.S.C. §119(e) of U.S. Provisional Application No. 61/740,367, filed Dec. 20, 2012.

BRIEF DESCRIPTION OF THE DRAWINGS

The present embodiments are illustrated by way of example, and not of limitation, in the figures of the accompanying drawings in which.

DETAILED DESCRIPTION

Embodiments described herein provide a memory controller that creates page frame specific encryption keys (referred to herein as frame keys) that are used to encrypt and decrypt data stored in the page frames. An operating system may cause process specific encryption keys (referred herein to as process keys) to be created that are used to encrypt and decrypt the frame keys. Encrypted frame keys may be stored in the memory. When a process attempts to access data that is stored in a page frame in memory, the memory controller uses a process key associated with that process to decrypt the frame key that was used to encrypt that page frame. If the page frame belongs to a different process (and has not been given access to the page frame), then the frame key will not be properly decrypted. As a result, the memory controller would be unable to decrypt the data in the page frame in the case of a read access. If the process to which the page frame was allocated attempts to read the page frame, the memory controller can successfully decrypt the frame key using the process key of that process. Thus processes that should have access to the data in the page frame are able to read them, while processes that should not have access to the page frame are unable to read them. This can eliminate the ability of a rogue process to illicitly gain access to the contents of memory allocated to another process. In some embodiments two processes may be granted shared access to a page frame. In such embodiments the same frame key is used to encrypt and decrypt data stored in the page frame when either process accesses them. The frame key is encrypted using each of the process keys to create two encrypted frame keys associated with the respective processes.

Figure 1:
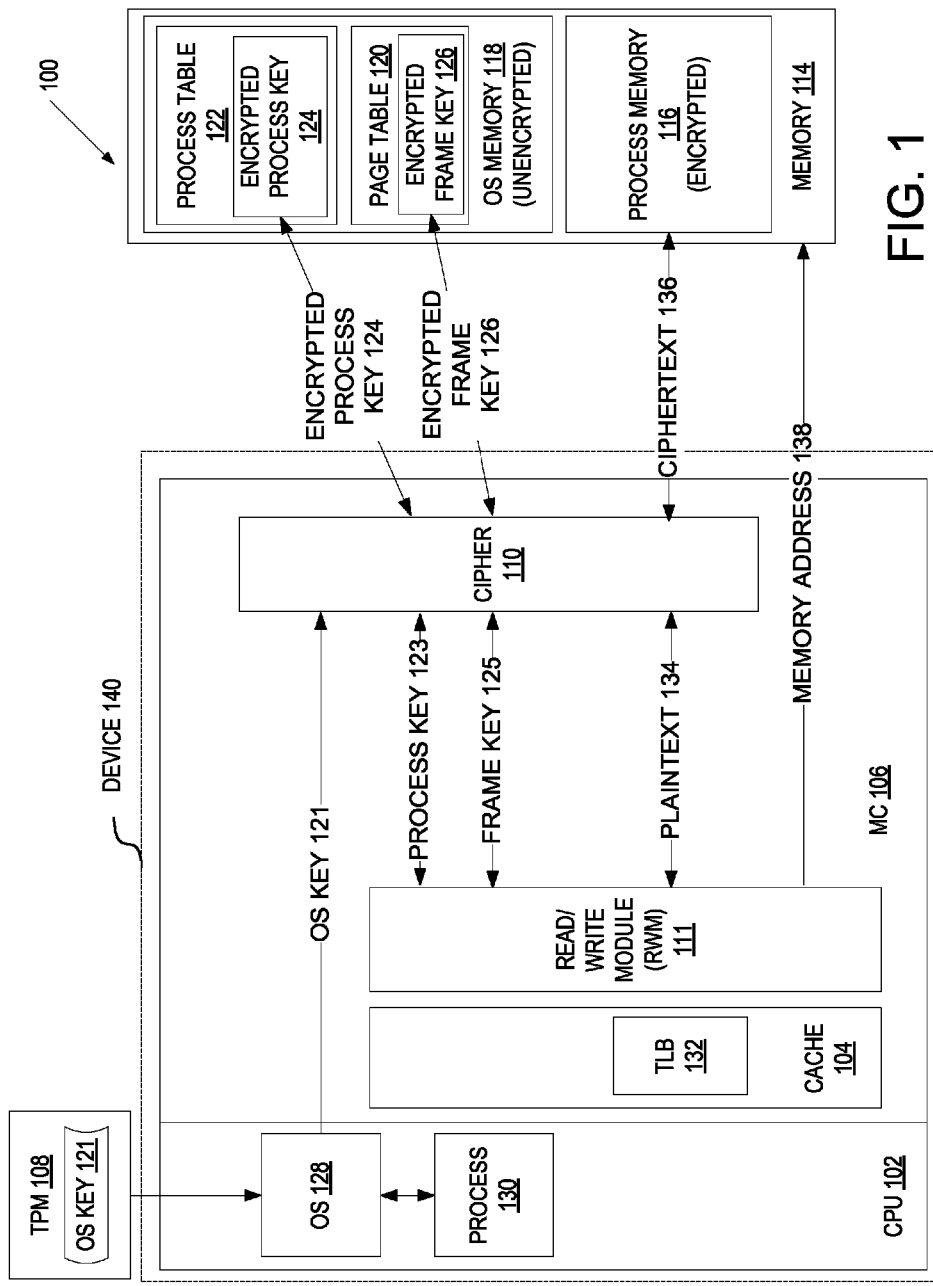
FIG. 1 is a block diagram illustrating computing device including a device coupled to a memory according to one embodiment.

FIG. 1 is a block diagram of a computing device 100, illustrating a device 140 coupled to a memory according to one embodiment. The device 140 may be implemented as a single package that incorporates multiple components such as a central processing unit (CPU) 102 and a memory controller (MC) 106. For example, the device 140 may be an integrated circuit that incorporates digital circuits for the CPU 102 and MC 106. Alternatively, one or more of the CPU 102 or MC 106 may be separate integrated circuits that are coupled via a bus or traces. The device 140 may additionally be coupled to a trusted platform module (TPM) 108 via a bus or traces, or the TPM 108 may be integrated into the device 140.

The CPU 102 executes instructions of an operating system (OS) 128 and processes 130 running on the operating system. The OS 128 may be an operating system that has support for the memory controller 106. Process 130 may be any application or program that is configured to run on OS 128. Though embodiments are described with reference to a central processing unit 102, it should be understood that other types of processing devices may also be used. For example, an array processor or vector processor may be used rather than a CPU 102 in some embodiments.

Instructions to be executed by the CPU 102 and data to be used by the CPU 102 are stored in memory 114. Memory 114 may be random access memory (RAM), dynamic RAM (DRAM), flash memory, static RAM (SRAM), or other types of memory. Memory 114 may be directly or indirectly connected to the CPU 102 via a memory bus, which may include an address bus and a data bus. The address bus may be used to transport memory addresses that indicate the location of data, and the data bus may be used to transport payload data to be stored in memory 114 or retrieved from memory 114.

Memory controller 106 manages the writing of data to memory 114 and the reading of data from memory 114. Memory controller 106 may include a read/write module 111 a cache 104 and a cipher 110. The read/write module 111 may read data from and write to memory 114 using physical addresses (e.g., row and column addresses) of memory 114. Read/write module 111 may include logic for translating virtual memory addresses to physical memory addresses, ensuring valid timing of requests to memory 114, and performing maintenance operations such as refresh operations in the case of DRAM memory. Read/write module 111 may additionally include logic for performing operations associated with memory, such as generating process keys, generating page keys, allocating memory, sharing memory, calling on cipher 110 to encrypt memory contents, calling on cipher 110 to decrypt memory contents, and so forth.

In an alternative embodiment, cipher 110 may be a logic of the device 140 that is coupled to the memory controller 106. Alternatively, cipher 110 may be a separate device that is coupled to device 140. Additionally, cache 104 may be a component of device 104 that is separate from MC 106.

Memory 114 may be logically divided into different sections for the storage of different types of information. As illustrated, the memory 114 is divided into process memory 116, which is used to store data from processes, and operating system (OS) memory 118, which is used to store data for an operating system. Data is stored in the process memory 116 at specific physical memory addresses. Ranges of physical memory addresses of the process memory 116 may be allocated to different processes. The process memory 116 may be stored in an encrypted format, and may be accessible to a process 130, while the OS memory 118 may be stored in an unencrypted format. Note that the OS memory 118 may alternatively be stored in an encrypted format. In one embodiment, OS 128 has access privileges to OS memory 118, but process 130 lacks such access privileges. However, the presence of software implementation flaws (bugs) may allow violation of such access control restrictions in some circumstances.

The OS memory 118 may include a process table 122 and a page table 120. Alternatively, the process table 122 may be stored in encrypted process memory 116. The process table 122 is a data structure that holds information about the processes managed by an operating system 128 running on the CPU 102. The process table 122 may include a separate entry for each process. Each entry may include a process identifier, a process owner, a process priority, environment variables for the process, a parent process, pointers to executable machine code of the process, a present state of a process, and so on. Each entry may also include an additional field for an encrypted version of a process key 124 assigned to that process. Alternatively, encrypted process keys may be maintained in a separate data structure in memory 114, and encrypted or unencrypted process keys may be stored in an additional internal memory included in device 140 that is not accessible by processes (e.g., by process 130). For example, the process key may be stored in a process key cache, which in one embodiment is an area of cache 104. An example process key will be discussed in greater detail below.

A separate page table 120 may exist in the OS memory 118 for each active process. A page table 120 is a data structure that stores mappings between virtual memory addresses and physical memory addresses. An entry in a page table 120 may map a particular virtual address to a particular physical address. Virtual addresses are unique to a particular process 130, whereas the same virtual addresses of different processes may map to different physical addresses. When a process requests access to memory that has been allocated to it, the operating system 118 or MC 106 uses the virtual address of the process and the contents of the page table for the associated process to determine a physical address where data is actually stored.

Memory addresses may be grouped together into page frames. A page frame may contain a range of memory addresses. A size for page frames can be 4 kilobytes (kb), or other sizes may also be used, such as 2 kb, 8 kb, 16 kb, and so on. An entry in a page table 120 may map the virtual addresses of a particular page frame to corresponding physical addresses. An entry of the page table 120 may include an encrypted frame key 126 that is used to encrypt and decrypt data for the corresponding page frame. The encrypted frame key 126 may be a 64 bit key or another sized key. In other embodiments, the encrypted frame key 126 may be stored in a separate table in memory 114 that does not store other page table entries, but is still associated with the corresponding process. In one embodiment, encrypted or unencrypted versions of frame keys are stored in a frame key cache, which may be an area of cache 104.

Embodiments are discussed herein with reference to frame keys generated for page frames. Since a page frame includes multiple addresses, a single frame key may apply to all the addresses in a page frame. In alternative embodiments, keys may be generated at a finer granularity than page frames. For example, keys may be generated for cache lines, which may be, for example, 64 bytes. It should be understood that embodiments discussed herein with reference to frame keys may also work with keys of such smaller sized blocks.

As mentioned, data is stored in physical addresses of process memory 116 in an encrypted state. To facilitate such encryption, MC 106 may include cipher 110. Cipher 110 is a hardware encryption module that may be used to encrypt process keys, encrypt frame keys, encrypt payload data, decrypt process keys, decrypt frame keys and decrypt payload data.

Cipher 110 may be a component of the memory controller 106, or may be a separate circuit coupled to the memory controller 106. Additionally, cipher 110 may be included in the same device (e.g., same integrated circuit) as memory controller 106 or in a separate device. In one embodiment, cipher 110 is a block cipher. For example, cipher 110 may operate on fixed length groups of bits, called blocks, that are the same size as page frames. Alternatively, cipher 110 may operate on blocks that are the same size as a cache line in cache 104. Cipher 110 may apply the data encryption standard (DES) encryption algorithm, the triple DES algorithm, the advanced encryption standard (AES) algorithm, the international data encryption algorithm (IDEA), the RC5 encryption algorithm, the Blowfish encryption algorithm, and/or another block cipher algorithm. The block ciphers may be used in various modes of operation, such as cipher block chaining mode, counter mode, or other modes. References to encryption and decryption based at least in part on a specific key may refer to use of that key in the literal key input to the cipher, in an initialization vector input to the cipher, or in any other input that modifies the encryption and decryption process.

In one embodiment, cipher 110 implements a modified form of the AES algorithm. Traditional AES performs multiple rounds of encryption (during an encryption process) and decryption (during a decryption process) for each block. Each round is performed using a different round key. Accordingly, traditional AES performs multiple rounds of key expansion to generate keys for the encryption and decryption rounds. Traditional AES uses a first expanded key to perform the first round of encryption, a second expanded key to perform a second round of encryption, and so on, so that a last expanded key is used to perform a last round of encryption. Accordingly, during decryption, in traditional AES the last expanded key is used to perform the first round of decryption. This means that during decryption all key expansion rounds are performed before a first decryption round can be performed.

In the modified AES algorithm used in accordance with one embodiment, during encryption key expansion rounds are performed prior to encryption rounds being performed. The last expanded key is then used for the first encryption round, and second to last expanded key is used for the second encryption round, and so on. During the decryption process, a first expanded key may be used in a first decryption round while subsequent key expansion rounds are being performed. Accordingly, decryption rounds may be performed in parallel to key expansion rounds. This may improve latency during memory read operations.

When a new process is started, memory controller 106 may generate a new process key 123 for that process. The process key 123 can be used to encrypt frame keys for page frames allocated to the process. The new process key 123 may be generated randomly using a random number generator. The process key 123 may also be dependent upon properties of the process, a time stamp (e.g., when the process started), a counter value, or other information. In one embodiment, an unencrypted version of the process key 123 is not revealed to the process that the process key belongs to or to the operating system. Instead, only an encrypted version of the process key may be provided to the OS 128 or process 130 in one embodiment. The unencrypted version of the process key may be constrained within hardware components of device 140. This may reduce a chance that the process key is leaked to other processes. In one embodiment, process key is a 64 bit key. Alternatively, process key may have other sizes.

When a page frame (e.g., corresponding to a range of addresses in process memory) is allocated to a process 130, memory controller 106 may generate a new frame key for that page frame. In one embodiment, cipher 110 generates the frame key 125. The frame key 125 may be used to encrypt data written to a range of memory addresses that are included in a page frame. As with the process key 123, the frame key 125 may be generated randomly using a random number generator. The frame key 125 may also be dependent upon properties of the page frame, a time stamp (e.g., when the process started), a counter value, or other information. In one embodiment, an unencrypted version of the frame key 125 is not revealed to the process to which the page frame associated with that frame key has been allocated or to the operating system. Instead, the unencrypted version of the frame key may be constrained within the device 140 hardware. Therefore, the process 130 and OS 128 may have access to the encrypted version of the frame key but lack access to the unencrypted version of the frame key. This may reduce a chance that the frame key is leaked to other processes.

The frame key 125 is used to encrypt plaintext data 134 of a page frame into ciphertext 136 before storing that data in process memory 116. Frame keys 125 may be encrypted using a process key 123 of a process to which an associated page frame has been allocated. The encrypted frame key 126 may then be stored in an entry of an appropriate page table 120.

Device 140 may be connected to TPM 108, which may generate an operating system (OS) key 121. In an alternative embodiment, TPM 108 may be integrated into device 140. The TPM 108 may be a secure, tamper resistant circuit configured to generate random or pseudorandom keys such as OS key 121. TPM 108 may also generate frame keys and/or process keys in one embodiment. In one embodiment, TPM 108 generates a new OS key 121 each time the device 140 powers on. The OS key 121 may be used as an input into cipher 110 for one or more encryption and/or decryption operations. For example, cipher 110 may use the OS key 121 to encrypt a process key 123 into an encrypted process key 124. The encrypted process key 124 may then be stored in an entry of process table 122. The OS key 121 may also be used during the generation of one or more of the process keys 123 and frame keys 125. In other embodiments, the OS key may be replaced by a unique CPU key, a key randomly generated by a random number generator within device 140 during system initialization, or other key that is not accessible to processes or to the operating system.

The CPU 102 (or other processing device) may be coupled with cache 104. The cache 104 can be a relatively small memory that stores copies of frequently used data that is located in memory 114. Access time to the cache 104 is much faster, and latency is much lower, than access time to the memory 114. Cache 104 may be a multi-level cache, with each successive level of cache being larger and having a slightly higher latency than a previous level of cache. For example, a level 1 (L1) cache may be the smallest and quickest cache, a level 2 (L2) cache may be slightly larger and slightly slower, and a level 3 (L3) cache may be larger and slower still.

The cache may include a reserved area called a translation look-aside buffer (TLB) 132, which is a cache of the page table 120 that stores the most commonly referenced virtual page addresses and their corresponding physical page addresses to minimize queries to the page table 120. When memory controller 106 receives requests associated with a virtual address in a page frame, memory controller 106 may check TLB 132 for the virtual address. If the virtual address of the page frame is not in the TLB 132, memory controller 106 may issue a TLB miss signal, which causes memory controller 106 to query the process table for the physical address associated with the virtual address. An entry for that virtual address may then be added to the TLB 132.

Embodiments herein describe memory controller 106 retrieving encrypted process keys and encrypted frame keys from memory and decrypting these keys responsive to a memory allocation request, a read request, a write request and a share memory request. To minimize queries made to memory 114 and to minimize decryption operations, in some implementations the TLB 132 additionally includes unencrypted versions of frame keys 125 and/or an unencrypted version of the process key 123. In one embodiment, a frame key 125 is stored in an additional field of a TLB 132 entry for an associated page frame. In alternative implementations, the frame key 125 and process key 123 may not be stored in TLB 132, and may instead be stored in a separate dedicated data structure in cache 104 (e.g., in a frame key cache and a process key cache).

When memory controller 106 receives a memory allocation request, a read request, a write request or a share memory request, memory controller 106 may check the TLB 132 (or other data structure in cache 104) to determine whether it holds an unencrypted version of the process key 123 associated with a requesting process. If the TLB 132 holds the process key, then memory controller 106 may forego querying the process table 122 for the encrypted process key 124 and decrypting the process key, and may instead retrieve the unencrypted process key 123 from TLB 132. In practice, a first request made for a process may have an additional overhead associated with a read operation on the process table 122 and a decryption operation, and subsequent requests made for that process may not incur any additional overhead over traditional memory operations.

Similarly, when memory controller 106 receives a request from the operating system 128 or a process 130 to read from, write to or share a virtual memory address associated with a page frame, memory controller 106 may first check the TLB 132 for the virtual address. If the virtual address is in the TLB 132, then memory controller 106 may retrieve an unencrypted frame key 125 associated with the page frame from the TLB 132 rather than retrieving it from page table 120. Thus, memory controller 106 may forego querying the page table 120 for the encrypted frame key 126 and decrypting the frame key. Thus, a first request made for a page frame may have an additional overhead associated with a read operation on the page table 120 and a decryption operation, and subsequent requests made to that page frame may not incur any additional overhead over traditional memory operations.

Accordingly, it should be understood that wherever embodiments describe a memory controller retrieving an encrypted process key or an encrypted frame key from memory and performing decryption operations on those keys, the memory controller may first query the TLB 132 (or other data structure in cache 104) for unencrypted versions of those keys. If an unencrypted version of a key is found in the TLB 132, the memory controller 106 may forego retrieving the encrypted version of that key from process table 122 or page table 120.

Once memory controller 106 has identified the physical address (or addresses) associated with a virtual address (or virtual addresses), it may check the cache 104 to determine whether the data associated with that physical address is included in a data cache line of cache 104. This may include checking for an address tag associated with a data cache line, the address tag having the physical address. If the physical address is in an address tag associated with a data cache line in the cache 104, then the memory controller 106 may retrieve data associated with that physical address from the cache 104 without querying memory 114. If the physical address is not in the cache 104, then the memory controller 106 uses the physical address to retrieve data from process memory 116. The retrieved data may be stored in cache 104, and may be provided to a requesting process.

Data may be stored in cache 104 in an unencrypted format. In some embodiments, memory controller 106 performs a verification to ensure that a process does not access cache lines of another process. Memory controller 106 may store an unencrypted frame key in each cache line as tag data (e.g., as a frame key tag) that is not accessible to the process itself. The memory controller may use this frame key tag to verify whether a requesting process should have access to the data at that address. The stored frame key may be a frame key of a page frame that includes a virtual address that maps to the physical address.

If a new process becomes active, the TLB 132 may be flushed of entries associated with a previous process, and entries associated with the new process may be added to the TLB 132. If that new process requests access to a particular memory address allocated to the previous process, memory controller 106 may query TLB 132, which may generate a TLB miss. If there is a TLB miss, and the address is in a cache line of cache 104, memory controller 106 may generate a new frame key for the page frame associated with that address based in part on the process key of the new process. Memory controller 106 may then compare the new frame key to the unencrypted frame key stored in the cache line. If the frame keys match, then memory controller 106 determines that the process should be given access to the cache line, and provides the data in the cache line to the process. If the frame keys fail to match, memory controller 106 does not provide access to the cache line, and may generate a fault.

Note that embodiments are described herein with reference to memory controller 106 handling the generation, encryption and decryption of process keys 123 and frame keys. In other embodiments a process or the OS 128 may perform such operations.

Figure 2A:
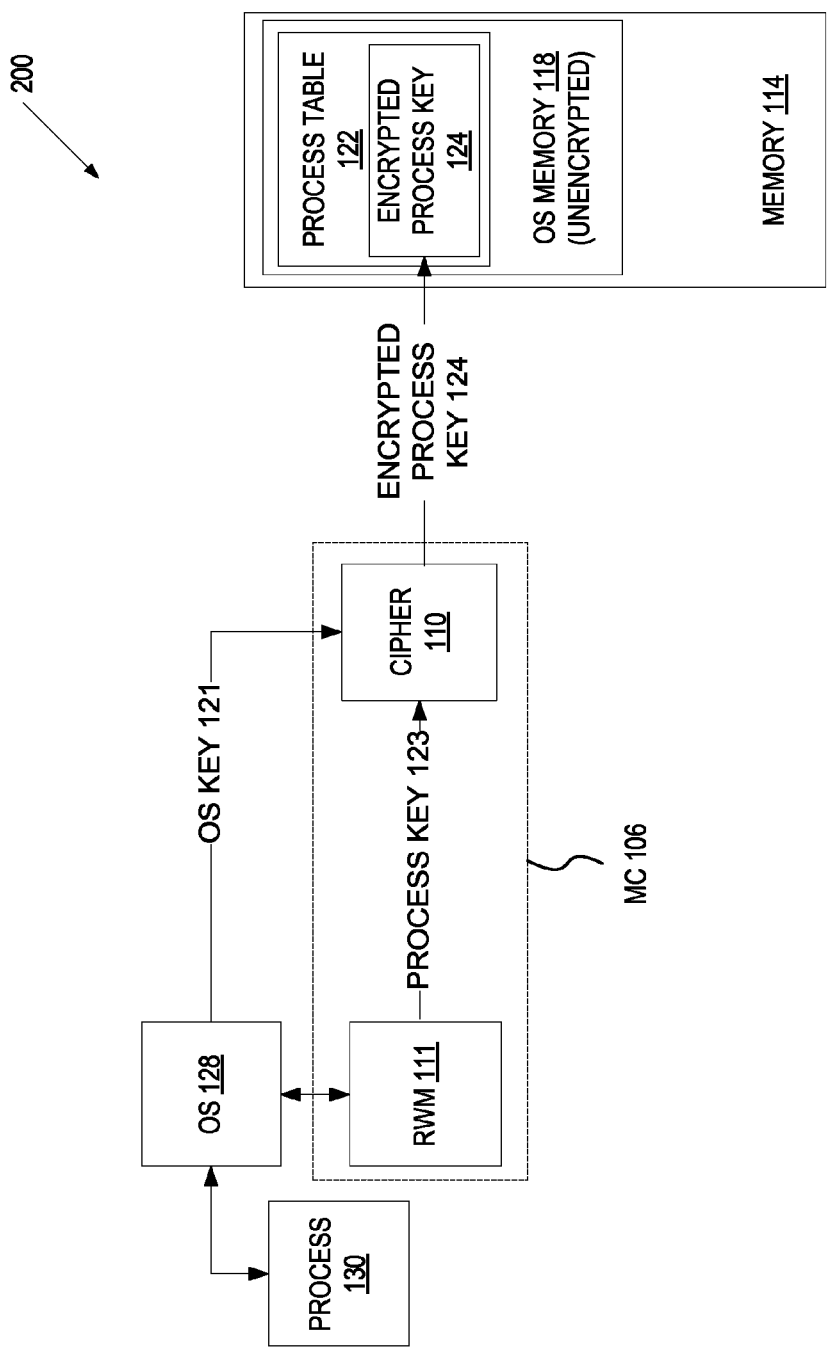
FIG. 2A is a block diagram illustrating components of a device that create a process key and store it in memory according to one embodiment.

FIG. 2A is a block diagram illustrating components of a computing device 200 that create a process key and store it in memory according to one embodiment. As illustrated, a process 130 is instantiated on an OS 128. Accordingly, the OS 128 adds an entry to process table 122 in OS memory 118 for the new process 150. The OS 128 also issues a call to the memory controller 106 to generate a process key for the process 130. The memory controller 106 generates the process key 123, and cipher 110 encrypts the process key 121 using an OS key 121 of the OS 128 (or using another key such as a CPU key or a random boot key). Memory controller 106 then stores the encrypted process key 124 in the entry for the process 130 in the process table 122.

Figure 2B:
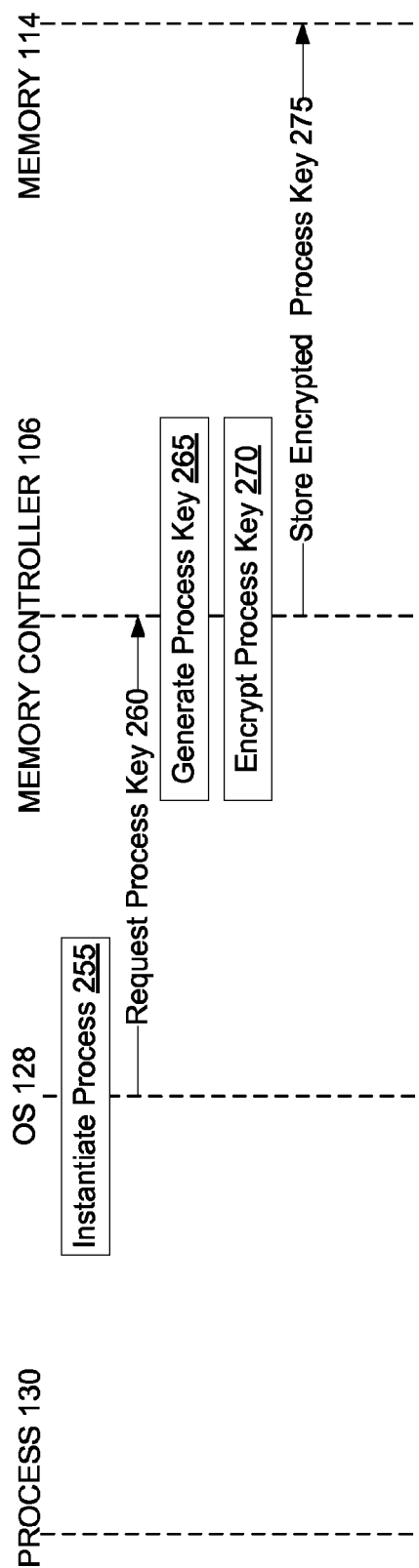
FIG. 2B is a sequence diagram showing one embodiment of generation of a process key.

FIG. 2B is a sequence diagram 250 showing one embodiment of generation of a process key. At block 255 an OS 128 instantiates a process. At block 260, the OS issues a call to the memory controller 106 to generate a process key. At block 265, the memory controller 106 generates the process key. At block 270, the memory controller encrypts the process key using a cipher. The memory controller 106 may then store the encrypted process key in memory (block 275).

Figure 3A:
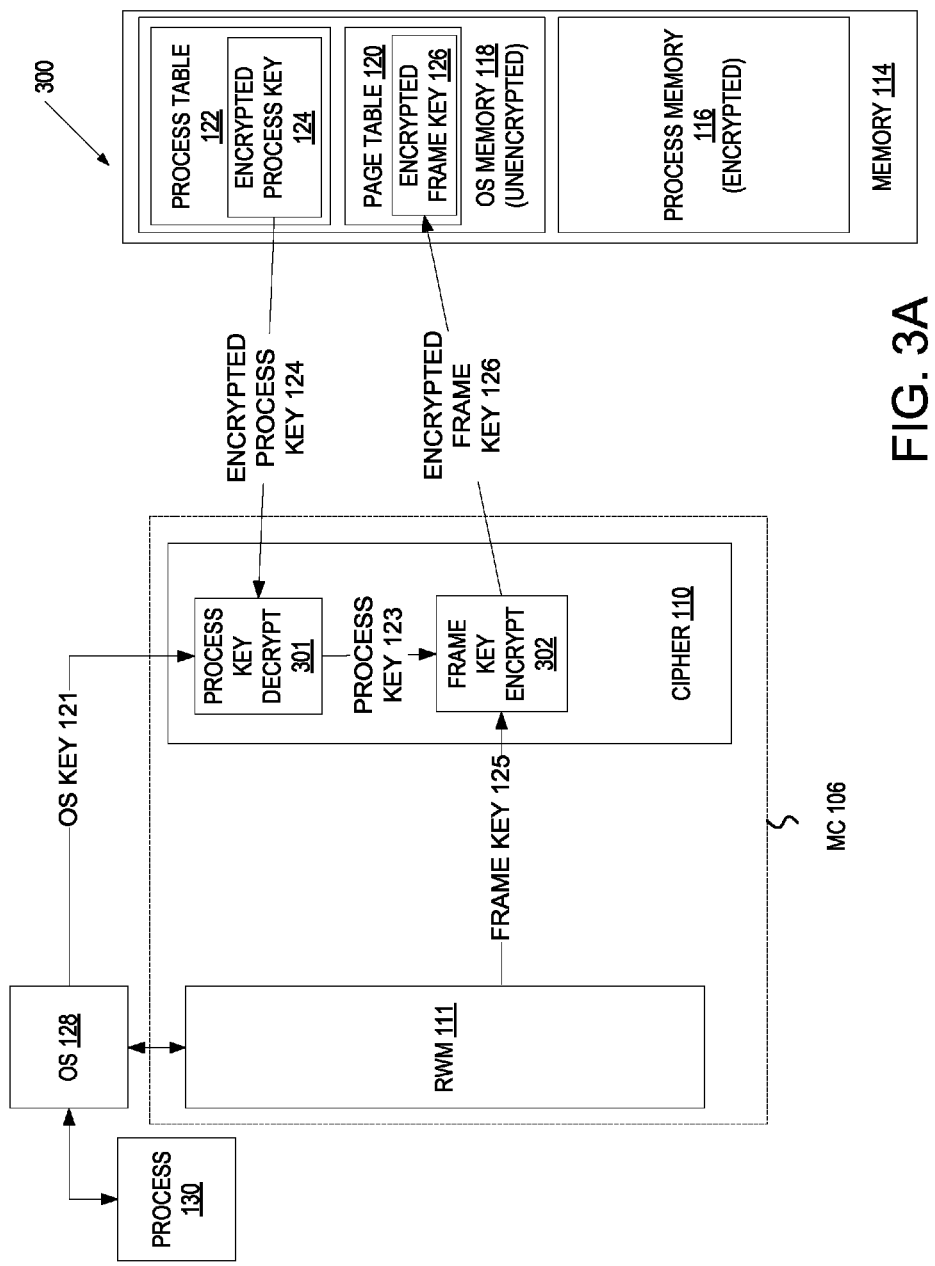
FIG. 3A is a block diagram illustrating components of a device that create a frame key for an allocated page frame according to one embodiment.

FIG. 3A is a block diagram illustrating components of a computing device 300 that create a frame key for a page frame. Process 130 may request the allocation of memory from OS 128. Additionally, the OS 128 may automatically issue a memory allocation call to the memory controller 106 responsive to the process 130 being loaded.

Responsive to receiving a system call from the OS 128 to allocate memory to process 130, read/write module 111 allocates a page frame (or multiple page frames) to the process. Additionally, memory controller 106 (or OS 128) may generate a frame key 125 for the allocated page frame. If multiple page frames are allocated, a separate frame key is generated for each page frame.

Memory controller 106 retrieves an encrypted process key 124 for the process 130 from process table 122. Cipher 110 may decrypt the encrypted process key 124 using an OS key 121 at process key decrypt block 301. Memory controller 106 provides the frame key to cipher 110, and cipher 110 encrypts the frame key 125 using the process key 123 at frame key encrypt block 302. Memory controller 106 may then store the encrypted frame key in an entry of page table 120. Page table 120 may be a page table for process 130, and the entry containing the encrypted frame key 126 may be an entry for the newly allocated frame page of memory.

Figure 3B:
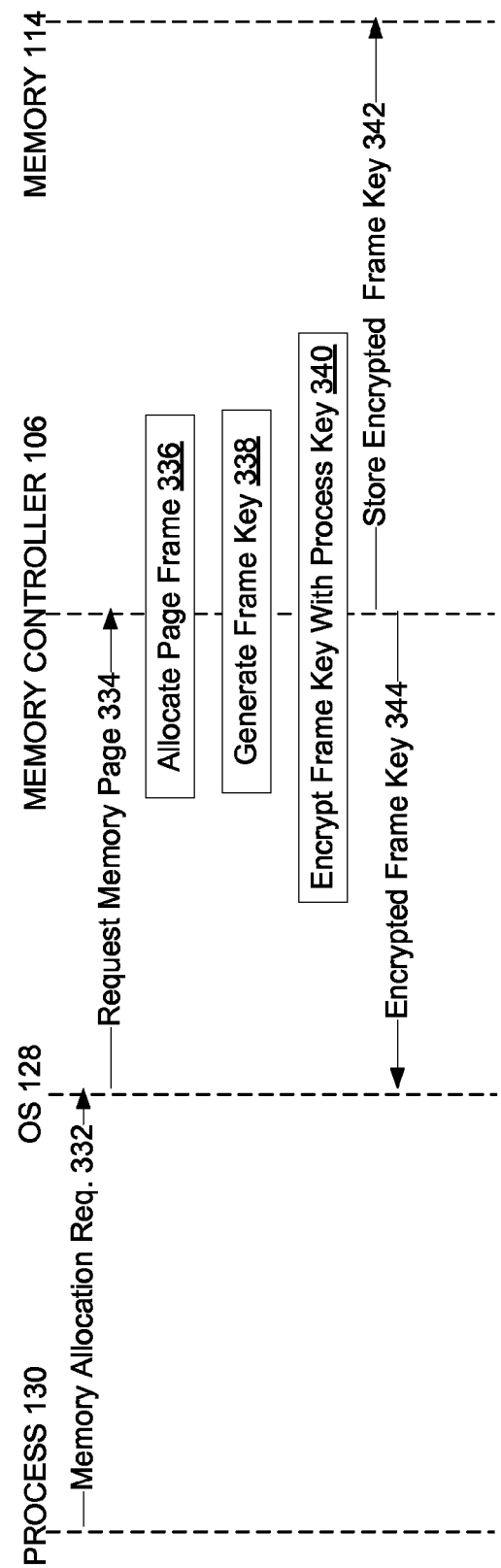
FIG. 3B is a sequence diagram showing one embodiment of memory allocation and generation of a frame key.

FIG. 3B is a sequence diagram showing one embodiment of memory allocation and generation of a frame key. At block 332 a process sends a memory allocation request to OS 128. OS 128 then issues a memory allocation system call to memory controller at block 334 to request a new memory page. Alternatively, OS 128 may issue a memory allocation request to memory controller 106 without first receiving a request from process 130. For example, OS 128 may detect that process 130 needs additional memory, such as when the process first loads, and subsequently issue the memory allocation request.

At block 336, the memory controller 106 allocates a page frame (also known as a memory page) to the process 130. At block 338, memory controller 106 generates a frame key for the page frame. At block 340, the memory controller encrypts the frame key using a process key associated with the process 130. The memory controller 106 may then store the encrypted frame key in memory (block 342), and may return the encrypted frame key to the OS (block 344).

Figure 3C:
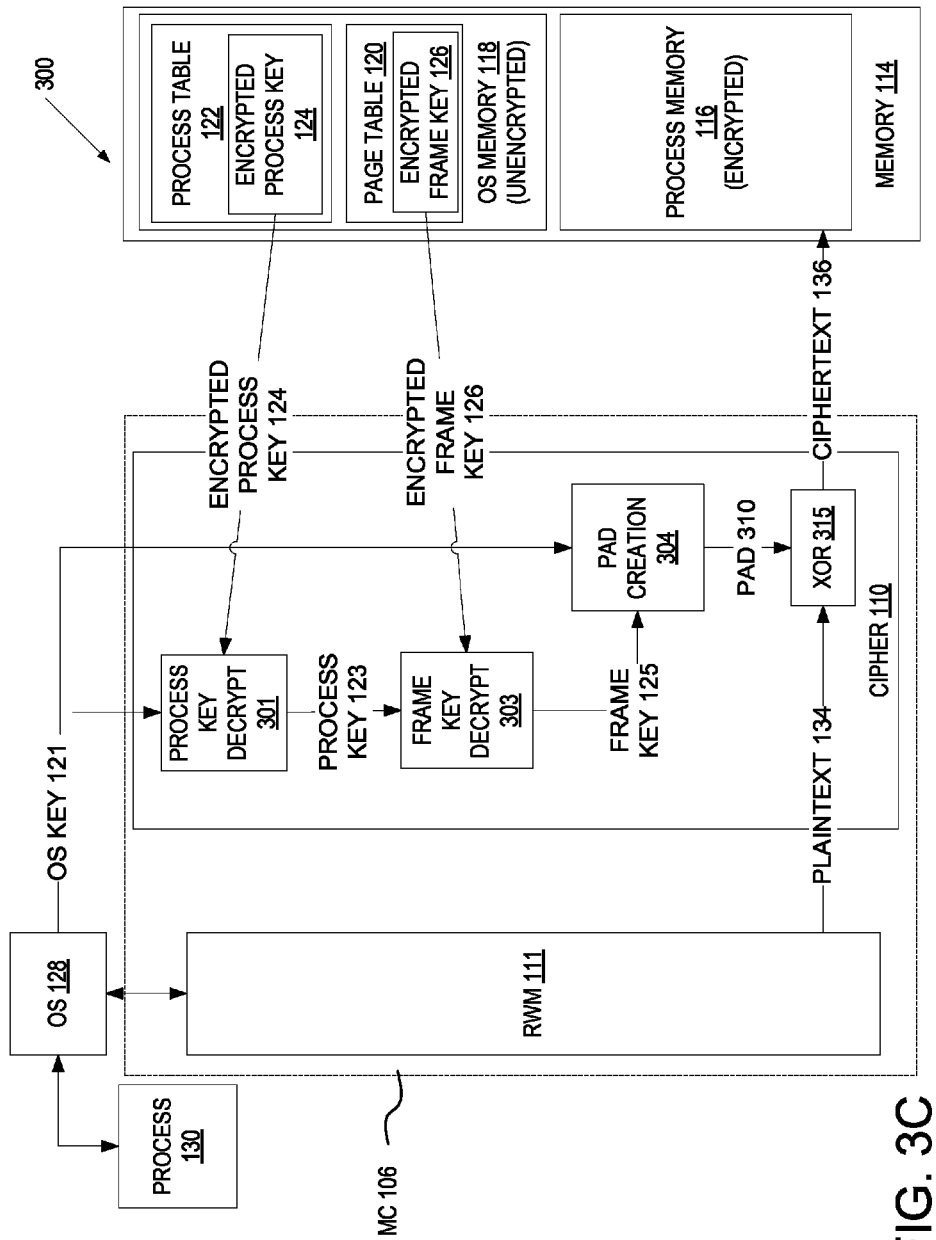
FIG. 3C is a block diagram illustrating components of a computing device that use a frame key to encrypt page frame data for storage in memory according to one embodiment.

FIG. 3C is a block diagram illustrating components of a computing device 300 that use a frame key to encrypt page frame data for storage in memory according to one embodiment. Process 130 may issue a write request to write data to an allocated page frame. Responsive to the request, memory controller 106 may retrieve an encrypted process key 124 for the process 130 from process table 122. Cipher 110 may decrypt the encrypted process key 124 using an OS key 121 at process key decrypt block 301. Memory controller 106 may additionally retrieve the encrypted frame key 126 from page table 120, and decrypt the encrypted frame key 126 using the process key 123 at frame key decrypt block 303.

Memory controller 106 may use the frame key 125, OS key 121 and/or additional data to generate a seed. The additional data may include a timestamp, a value of a counter (e.g., that is incremented each time a new page frame is allocated or a new write request is made to a particular address), a random value, an address of the page frame, and so on. The seed may be used by cipher 110 along with the frame key 125 and/or OS key 121 to generate an encryption pad 310 at pad creation block 304. The seed may be used as a literal key input to the cipher, as an initialization vector for the cipher, or any other input that modifies generation of the encryption pad. A modular addition (XOR) operation 315 is then performed between plaintext 134 of a page frame and the encryption pad 310 to create ciphertext 136. The ciphertext 136 can then be stored to appropriate physical addresses in process memory 116 associated with the page frame.

Figure 3D:
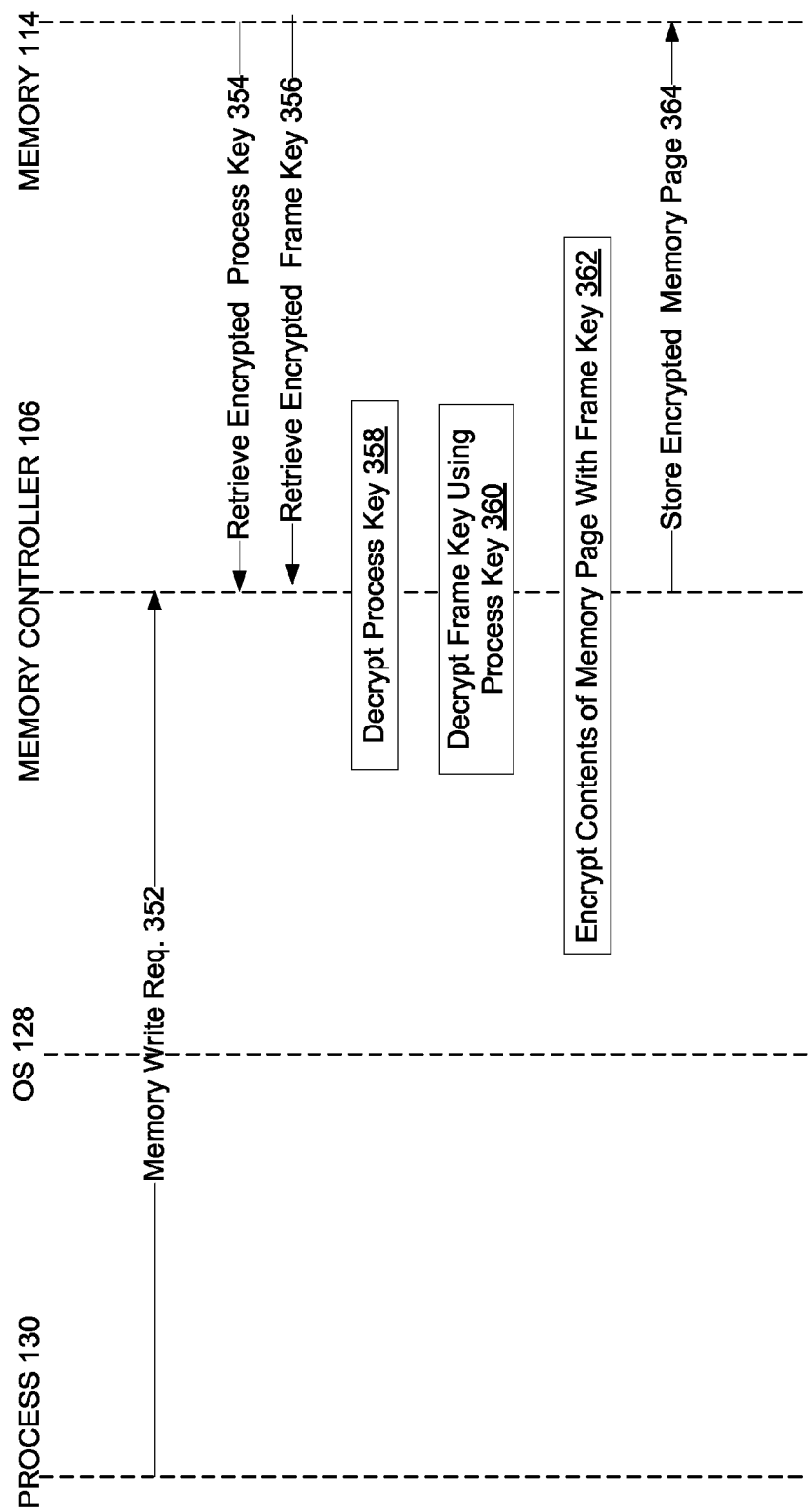
FIG. 3D is a sequence diagram showing one embodiment of writing to an allocated page frame.

FIG. 3D is a sequence diagram showing one embodiment of writing to an allocated page frame. At block 352 a process 130 issues a memory write request to memory controller 106. Alternatively, the process 130 may send a memory write request to OS 128, which may send it on to memory controller 106. The memory write request may specify a page frame to write data to. Memory controller 106 retrieves an encrypted process key associated with process 130 from memory 114 (block 354), and additionally retrieves an encrypted frame key 356 associated with the page frame that is to be written to from memory 114 (block 356).

At block 358, memory controller 106 decrypts the process key (e.g., using an OS key). At block 360, the memory controller 106 then uses the process key to decrypt the frame key. At block 362, memory controller 106 encrypts contents of the memory page (plaintext that may be written to the page frame) using the frame key 362. At block 364, the memory controller 106 stores the encrypted memory page at physical addresses corresponding to the page frame.

Figure 4:
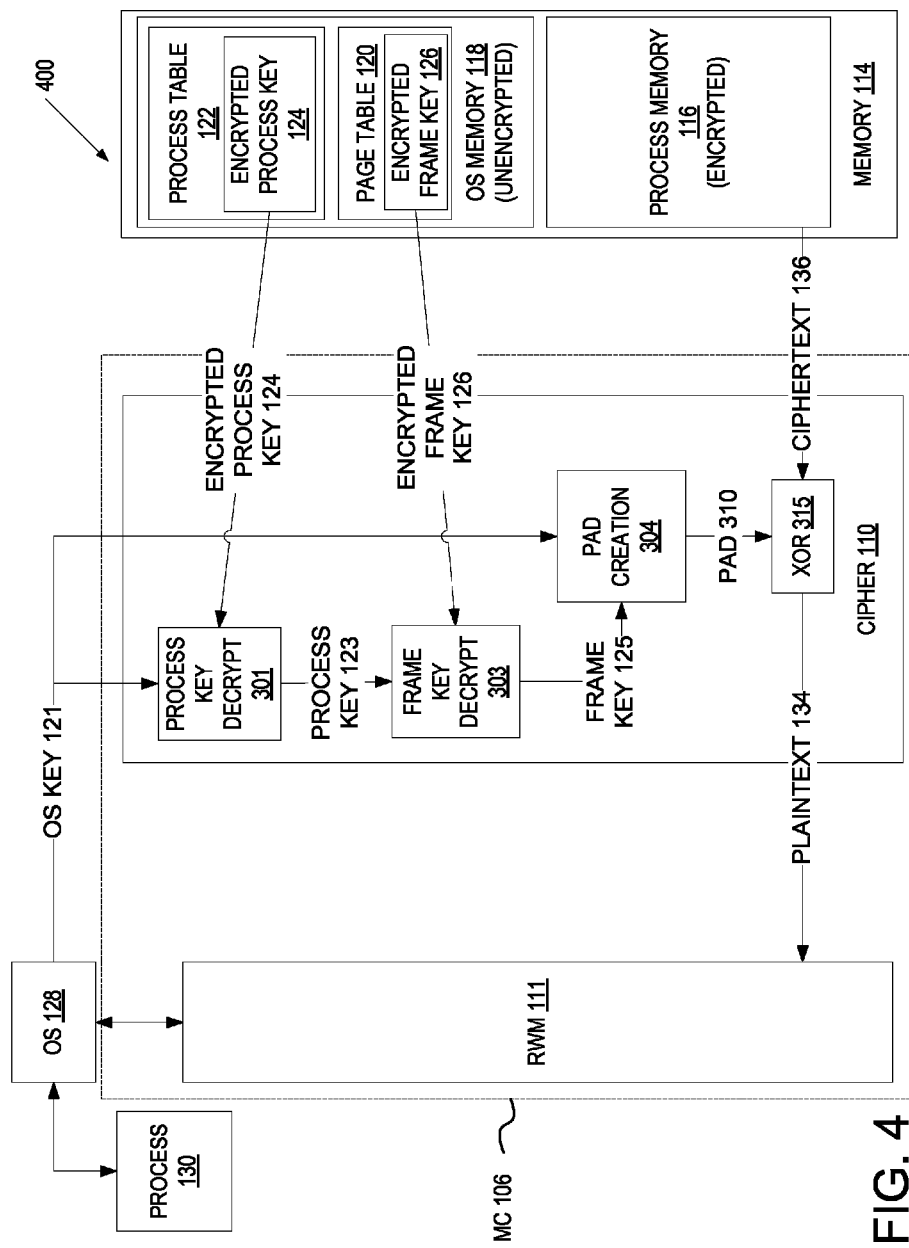
FIG. 4 is a block diagram illustrating components of a device that reads an encrypted page frame from memory according to one embodiment.

FIG. 4 is a block diagram illustrating components of a computing device 400 that read an encrypted page frame from memory according to one embodiment. The read process may be similar to the write process described with reference to FIGS. 3C and 3D. Process 130 may issue a read request to read data stored in a particular page frame. Responsive to the read request, memory controller 106 may retrieve encrypted process key 124 associated with process 130 from process table 122. Memory controller 106 may use cipher 110 to decrypt the encrypted process key 124 into process key 123 at process decrypt block 301. Memory controller 106 may additionally retrieve encrypted frame key 126 associated with the page frame from page table 120, where page table 120 is associated with process 130. Memory controller 106 inputs the process key 123 and encrypted frame key 126 into cipher 110 to decrypt encrypted frame key 126 into frame key 125 at frame key decrypt block 303. Processing logic then uses the frame key 125, OS key 121 and/or additional information (e.g., timestamp associated with page frame, counter value associated with page frame, random value associated with page frame, etc.) to recreate a seed that was used to generate an encryption pad previously used to encrypt the contents of the page frame. The recreated seed is input into cipher 110 along with the frame key 125 and/or OS key 121 to recreate the encryption pad 310 at pad creation block 304.

Memory controller 106 may read encrypted ciphertext 136 for the requested page frame from process memory 116 in parallel to generation of the encryption pad 310. This reduces a latency associated with performing a decryption operation. The retrieved ciphertext 136 may be combined with the encryption pad 310 using an XOR operation to produce plaintext 134, which may be returned to process 130.

Figure 5A:
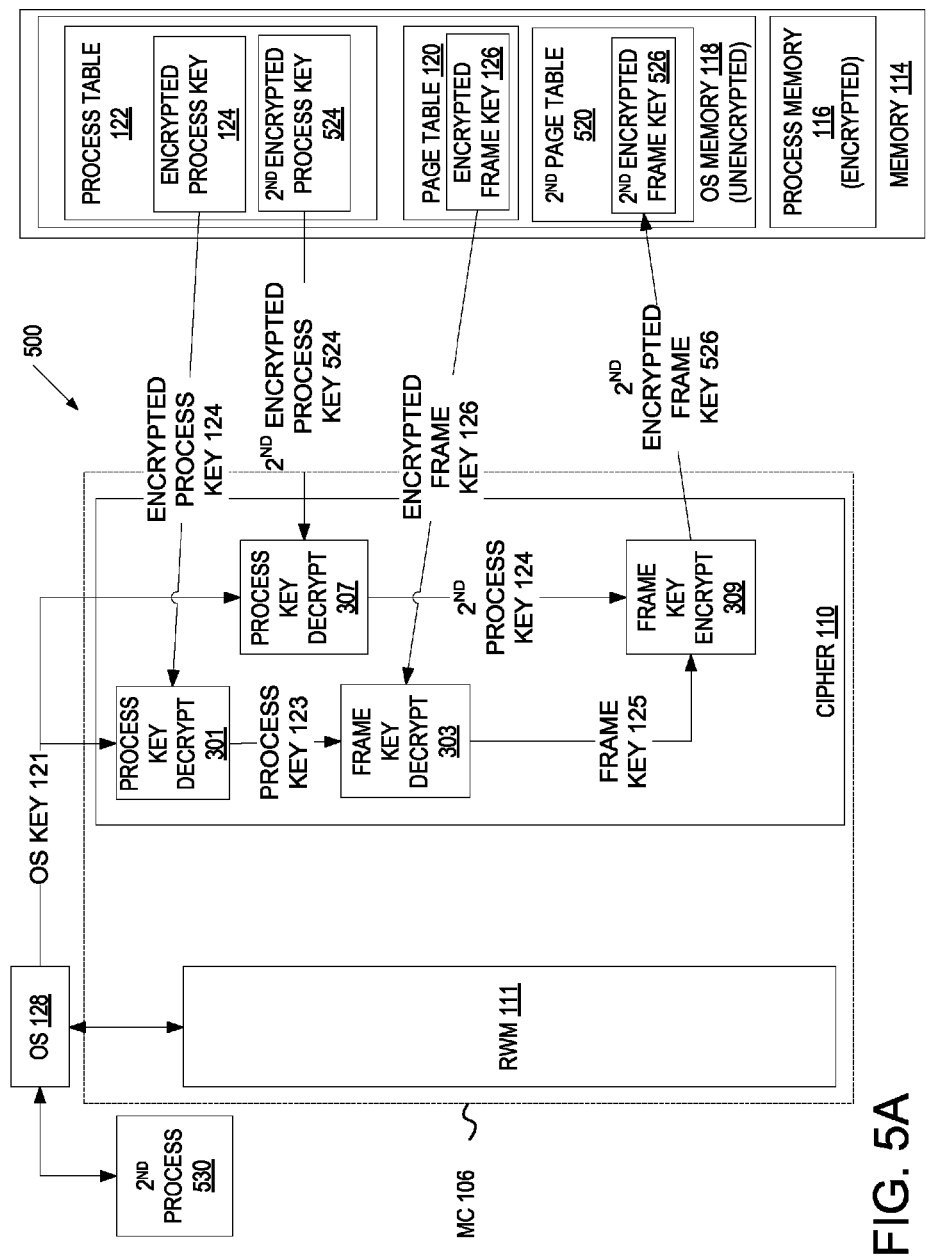
FIG. 5A is a block diagram illustrating a second process accessing a page frame stored in memory for a first process according to one embodiment.

FIG. 5A is a block diagram illustrating a computing device 500 with a second process accessing a page frame stored in memory for a first process according to one embodiment. As discussed above, the contents of a page frame are encrypted using a frame key associated with that page frame, and the frame key is encrypted using a process key associated with a particular process to which the page frame has been allocated. Accordingly, a second process attempting to access the contents of the page frame would receive unreadable data, because it would attempt to use its own process key to decrypt its own encrypted frame key, resulting in a different unencrypted frame key. Because unencrypted frame keys and process keys are not accessible by the processes, they cannot construct proper encrypted frame keys for page frames by any means other than the normal memory controller brokered access procedures. Accordingly, an additional memory sharing process may be performed to grant a second process access to a page frame used by a first process.

Second process 530 may issue a request to OS 128 to read data stored in a page frame allocated to a different process (e.g., process 130). If OS 128 determines that it is valid to grant second process 530 access to the page frame, OS 128 may issue a share memory call to the memory controller 106. The share memory call may include an identifier of the page frame, an identifier of the second process and/or an identifier of the other process that the page frame belongs to. Embodiments that support such memory sharing between processes should be free of defects in the processes for determining validity of sharing requests. However, these processes have a much smaller scope than those for arbitrating all forms of access control and virtual memory management (address translation), and so can practically be designed to have a smaller absolute probability of such a flaw.

Responsive to the share memory call, memory controller 106 retrieves a first encrypted process key 124 associated with the process to which the requested page frame is allocated from process table 122. Memory controller 106 additionally retrieves a second encrypted process key 524 associated with the second process 530 from the process table. Memory controller 106 then decrypts both process keys using cipher 110 and OS key 121.

Memory controller 106 additionally retrieves encrypted frame key 126 from page table 120, where the page table 120 is associated with the first process to which the page frame is allocated. Memory controller 106 uses cipher 110 and the process key 123 to decrypt the encrypted frame key 126 and recreate frame key 125. Memory controller 106 then inputs the frame key into cipher 110, and uses the second process key 124 and cipher 110 to generate a second encrypted version of the frame key 526, which is stored in a second page table 520 associated with the second process 530. Accordingly, each process that has access to a page frame may have its own encrypted version of the frame key used to encrypt that page frame.

Figure 5B:
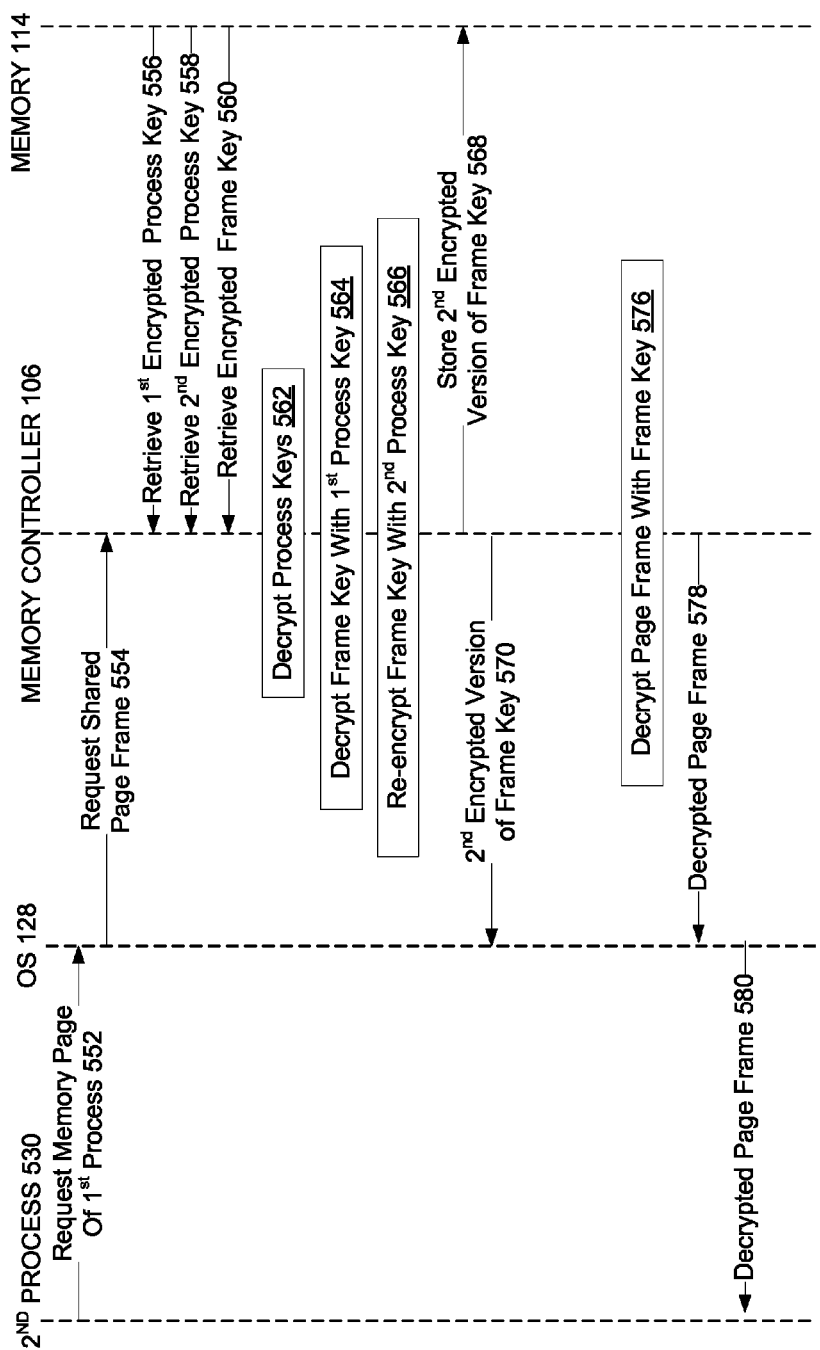
FIG. 5B is a sequence diagram showing one embodiment of a second process accessing a page frame stored in memory for a first process.

FIG. 5B is a sequence diagram showing one embodiment of a second process 530 accessing a page frame stored in memory for a first process. At block 552, second process 530 sends to OS 128 a request to access memory allocated to a first process. At block 554, the OS 128 issues a share memory call to memory controller 106. The memory controller 106 then retrieves a first encrypted process key associated with the first process (block 556), a second encrypted process key associated with second process 530 (block 558) and an encrypted frame key associated with the page frame (block 560).

At block 562, the memory controller 106 decrypts the process keys. At block 564, the memory controller decrypts the frame key using the first process key. At block 566, the memory controller 106 re-encrypts the frame key using the second process key. The memory controller may then store the second encrypted version of the frame key in a page table of memory 114 (block 568). Memory controller 106 may also send the second encrypted version of the frame key to OS 128 (block 570).

Memory controller 106 may additionally decrypt data stored in the page frame using the frame key at block 576. Memory controller 106 may return the decrypted data from the page frame to OS 128 (block 578), which may forward it on to the second process 530 (block 580). Alternatively, memory controller 106 may send the decrypted page frame directly to second process 530.

Responsive to any future read or write request from the second process 530 for the page frame, memory controller 106 can retrieve the second encrypted version of the frame key and the second encrypted process key, decrypt the frame key with the process key, and decrypt or encrypt the page frame data with the frame key. Thus, after the initial sharing operation is performed, second process can use its own process key and encrypted version of the frame key to access the page frame for read or write operations.

Figure 6:
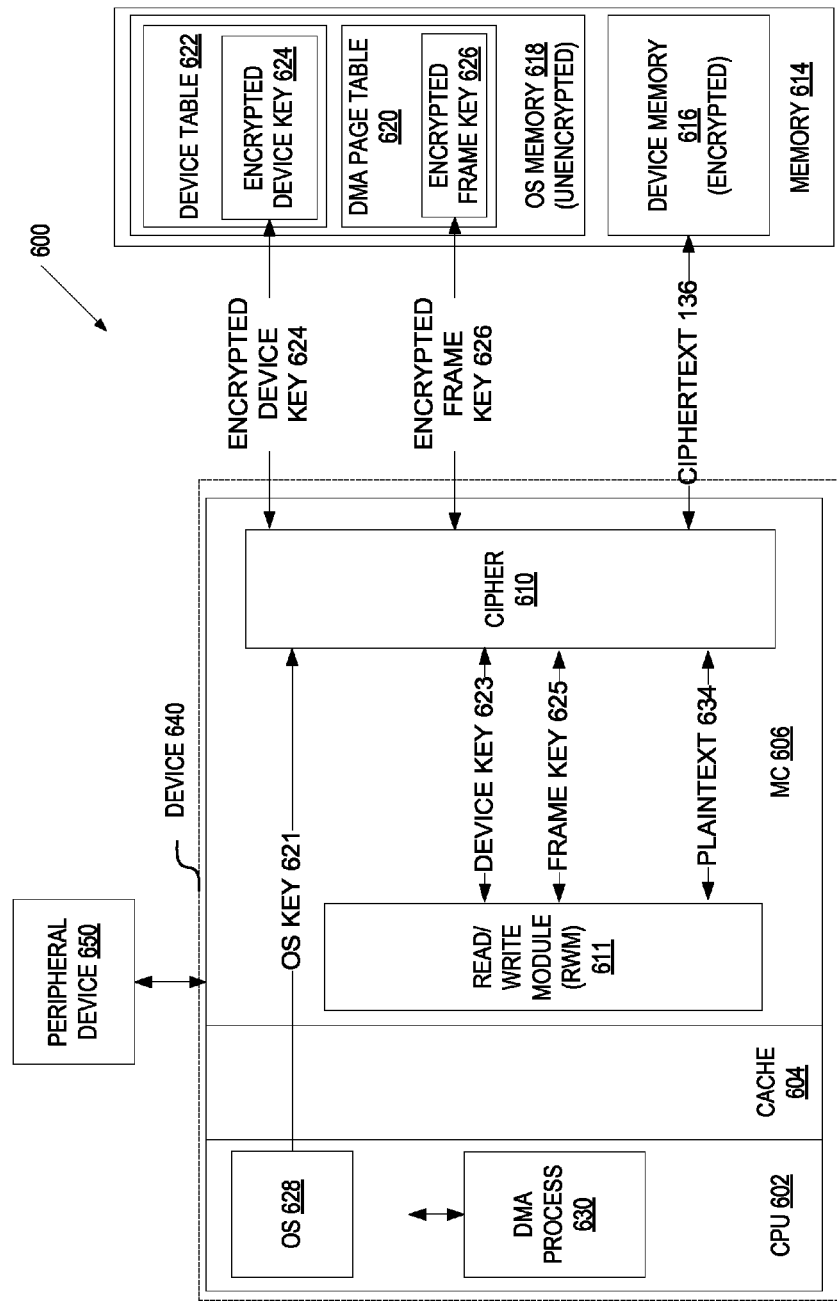
FIG. 6 is a block diagram illustrating a device coupled to a memory according to an embodiment.

FIG. 6 is a block diagram illustrating a computing device 600 including a device 640 (e.g., an integrated circuit) coupled to a memory 114 and to a peripheral device 128 according to an embodiment. Device 640 may include a CPU 602, a cache 604, a memory controller 606 and a cipher 610, and may correspond substantially to device 140 of FIG. 1. Similarly, memory 614 may correspond substantially to memory 114 of FIG. 1. However, one or more of CPU 602, cache 604, memory controller 606 and cipher 610 of device 640 may be configured to securely manage direct memory access (DMA) requests from peripheral devices 650. Similarly, OS 628 may be configured to securely manage DMA requests from peripheral devices 650, and memory 614 may store additional data structures for the secure management of DMA accesses.

Peripheral device 650 may be a disk drive controller, a graphics card, a network card, a sound card or other peripheral device. Device 640 may provide peripheral device 650 direct memory access (DMA). DMA is a type of memory access that enables the peripheral device 650 to read from and write to memory without involving CPU 602. DMA enables data to be transferred to and from peripheral device 650 with minimal impact on the CPU 602. However, DMA can introduce security risk with regards to the security of data stored in memory 614 if DMA transfers can bypass the encryption and access control mechanisms.

In one embodiment, OS 628 creates a device table 622 in OS memory 618, and may add an entry to the device table for each peripheral device 650 that uses DMA. Entries in the device table 622 may include information about the peripheral devices, such as a device identifier. OS 628 may instantiate a DMA management process for each peripheral device 650. Entries in the device table 622 may include an identifier of a DMA management process (DMA process) 630 associated with a particular peripheral device 650. Alternatively, a single DMA process 630 may be used to manage all peripheral devices that uses DMA.

The DMA management process 630 may issue memory allocation requests to the OS 628 and/or memory controller 606. OS 628 may assign a range of physical memory addresses of memory 614 to peripheral device. This range of physical memory addresses may correspond to device memory 616. OS 628 may additionally map those physical addresses to virtual addresses in a DMA virtual address context of the peripheral device 650 in one embodiment.

The DMA management process and/or OS 628 may additionally generate a DMA page table 620 for managed peripheral device 650. The DMA page table 620 may function similarly to a standard page table, and may map virtual addresses from the DMA virtual address context of peripheral device 650 to physical addresses of device memory 616. Alternatively, the DMA page table 620 may include physical addresses, but may not include any virtual addresses.

Memory controller 606 may generate a device key 623 for the peripheral device 650. The device key 623 may behave in a similar manner to the process keys described earlier. Memory controller 606 may use cipher 610 and OS key 621 to encrypt the device key, and store an encrypted device key 624 in device table 622.

Memory controller 606 may additionally generate frame keys 625 for each page frame that has been allocated to the peripheral device 650. Encrypted frame keys 626 may be stored in entries of the DMA page table 620 alongside physical addresses and/or virtual addresses for the page frames associated with the frame keys. Memory controller 606 may use cipher 610 and the device key 623 to encrypt the frame keys 625, and may store the encrypted frame keys 626 in entries of the DMA page table 620 for peripheral device 650.

Once frame keys 625 and a device key 623 have been generated for peripheral device 660, peripheral device 660 may use these keys to encrypt and decrypt data stored in device memory 616. For example, memory controller 606 may encrypt plaintext 634 of data to be stored in a page frame with an encryption pad based in part on frame key 625, and may encrypt the frame key 625 based in part on a device key 623. Memory controller 606 may then store ciphertext 136 of data to be stored in the page frame in device memory 616, may store the encrypted frame key 626 in DMA page table 620, and may store encrypted device key 624 in device table 622.

Additionally, a process may issue a memory sharing request for a page frame originally allocated to peripheral device 650. Memory controller 606 may respond to the memory sharing request in the same manner described with reference to FIGS. 5A-5B with regards to memory sharing between processes. Moreover, a peripheral device may issue a memory sharing request for a page frame originally allocated to a process or to another peripheral device. Again, memory controller 606 may respond to the memory sharing request in the same manner described with reference to FIGS. 5A-5B with regards to memory sharing between processes.

Figure 7:
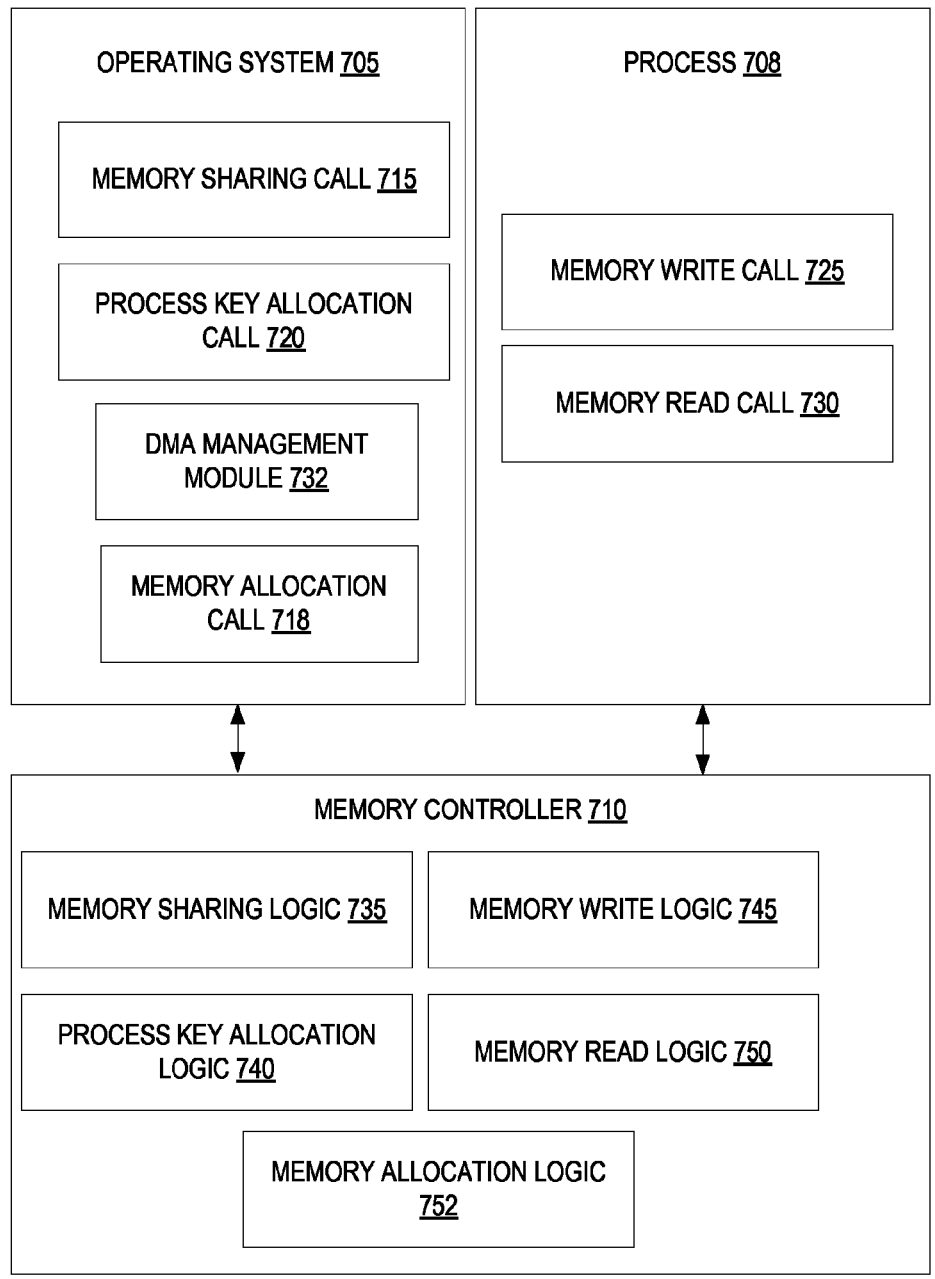
FIG. 7 is a block diagram showing system calls of an operating system and logics of a memory controller associated with process authenticated memory page encryption.

FIG. 7 is a block diagram showing system calls of an operating system 705, calls of a process 708, and logics of a memory controller 710 associated with process authenticated memory page encryption. Memory controller 710 may include a memory sharing logic 735, a process key allocation logic 740, a memory allocation logic 752, a memory write logic 745 and a memory read logic 750. Each of these logics 735-750 may perform different operations associated with the process specific encryption of memory pages. Operating system 705 may include a memory sharing call 715, a process key allocation call 720 and a memory allocation call 718. Process 708 may include a memory write call 725 and/or a memory read call 730. These system calls 715-730 may invoke the logics 735-750 of memory controller 710. Additionally, the operating system 705 may include a DMA management module 732.

Process key allocation call 720 may be used when a process is instantiated. Process key allocation call 720 invokes process key allocation logic 740. Process key allocation logic 740 creates a process key for the instantiated process. Process key allocation logic 740 may then encrypt the process key and return the encrypted process key to operating system 705 for storage in a process table. Alternatively, process key allocation logic 740 may store the encrypted process key in the process table.

Memory allocation call 718 may be issued by a process and/or by operating system 705 to invoke memory allocation logic 752. For example, a process may request memory from operating system 705, and in response operating system 705 may issue memory allocation call 718 to memory controller 710. Memory allocation logic 752 allocates physical addresses of memory to a particular process. Memory may be allocated in page frames, each of which may contain, for example, 4 kb blocks of addresses. Memory allocation logic 752 may map the allocated physical addresses to virtual addresses in a virtual address context of the process to which the memory is allocated. The physical addresses and virtual addresses that map to those physical addresses may then be stored in a page table of the process. Additionally, memory allocation logic 752 generates a unique frame key for each allocated page frame. Memory allocation logic 752 retrieves the encrypted process key from the process table, decrypts the process key, and uses the process key to encrypt the frame key. Memory allocation logic 752 may return the encrypted frame key to operating system 705 for storage in the page table. Alternatively, memory allocation logic 752 may store the encrypted frame key in the page table. Note that part of the memory allocation logic 752 may be performed by the operating system 705 in software. For example, the OS 705 may find out about unallocated page frames and track which page frames are allocated. The OS 705 may then pass a page frame start address to hardware logic to generate the encrypted key for the page frame and then generate appropriate page table entries.

Memory write call 725 may be issued by process 708, and may invoke memory write logic 745. An issued memory write call may include an identifier of a page frame to write to. Alternatively, an allocated page frame may automatically be selected by memory write logic 745. Memory write logic 745 retrieves the encrypted process key associated with the process from the process table, and subsequently decrypts the process key. Memory write logic 745 additionally retrieves the encrypted frame key associated with the page frame, and decrypts the frame key using the process key.

Memory write logic 745 uses the frame key to encrypt plaintext that is to be stored in the page frame. Once the data of the page frame is encrypted, memory write logic writes the encrypted contents of the page frame to physical memory associated with that page frame.

Memory read call 730 may be issued by process 708, and may invoke memory read logic 750. An issued memory read call includes an identifier of a page frame or a virtual address. Memory read logic 750 retrieves the encrypted process key associated with the process from the process table, and subsequently decrypts the process key. Memory read logic 750 additionally retrieves the encrypted frame key associated with the page frame, and decrypts the frame key using the process key.

Memory read logic 750 uses the frame key to decrypt ciphertext of the page frame that is stored in physical memory addresses associated with the page frame. Memory read logic 750 may then return plaintext of the page frame to the requesting process.

Memory sharing call 715 may be issued by a process that intends to gain access to a page frame allocated to another process. The issued memory sharing call 715 may include an identifier of the page frame to be accessed, which may be a global name, or virtual address, a physical address, and so on.

Memory sharing call invokes memory sharing logic 735. Memory sharing logic 735. Memory sharing logic 735 retrieves an encrypted first process key of the process that requested to share the page frame, and decrypts the first process key. Memory sharing logic 735 additionally determines a second process that currently has access to the page frame. Memory sharing logic 735 retrieves a second process key of that second process from the process table and decrypts it.

Memory sharing logic 735 additionally retrieves the encrypted frame key associated with the page frame from a page table of the second process, and decrypts the frame key using the second process key. Memory sharing logic 735 then re-encrypts the frame key using the first process key. Memory sharing logic 735 may then return the re-encrypted frame key to the operating system 705 for the operating system 705 to store the re-encrypted frame key in a page table of the first process.

Any subsequent read or write requests issued to the page frame by the first process may be satisfied in the same manner as described above with reference to the memory write call 725 and memory read call 730. Such calls issued by the first process would cause the re-encrypted frame key associated with that process (rather than the originally encrypted version of the frame key associated with the second process) to be retrieved. Thus, two different processes may securely access the same page frame using different encrypted versions of a frame key, where each encrypted version having been generated using a different process key.

DMA management module 732 may be loaded to create an instance of a DMA manager process. The DMA manager process may correspond to DMA manager process 630 of FIG. 6, and may generate and/or add entries to a device table, generate a DMA page table for a peripheral device, allocate memory to a peripheral device, and so on.

FIGS. 8-11 are flow diagrams showing various methods associated with process specific encryption of memory. The methods may be performed by a memory controller using hardware (e.g., circuitry, dedicated logic, programmable logic, microcode, etc.) and/or firmware (e.g., code stored in persistent memory of the memory controller). Some operations of the method may also or alternatively be performed by software (e.g., by an operating system running on a CPU coupled to the memory controller).

Figure 8:
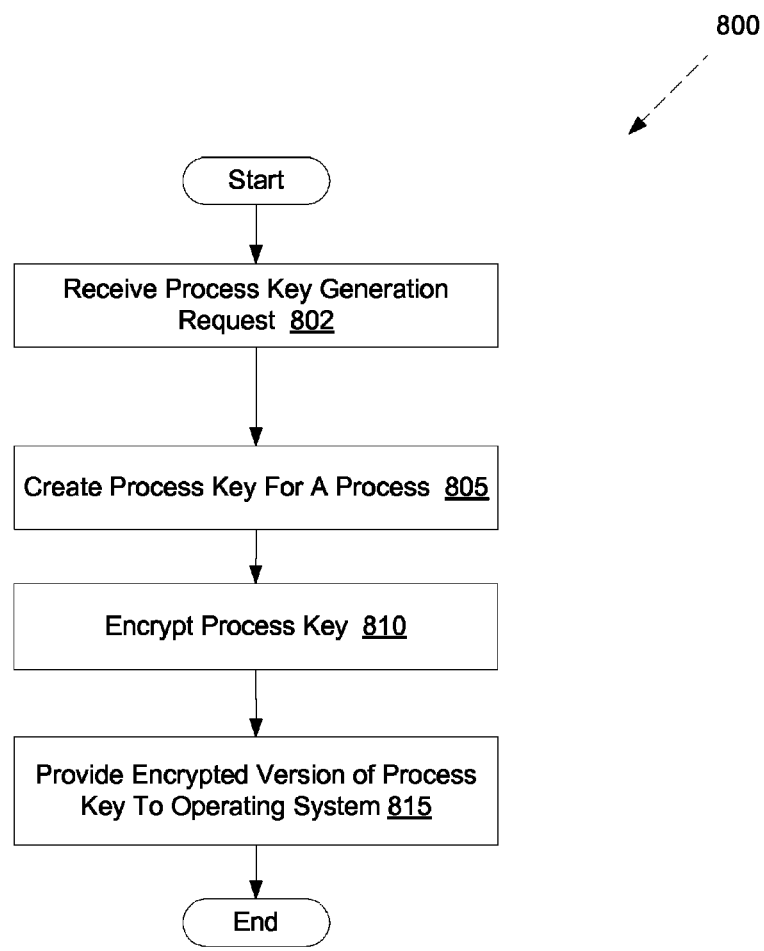
FIG. 8 is a flow diagram of one embodiment for a method of creating a process key.

FIG. 8 is a flow diagram of one embodiment for a method 800 of creating a process key. Method 800 may perform operations that are illustrated in FIGS. 2A and 2B. At block 802 of method 800, processing logic receives a process key generation request 802. The process key generation request may be a particular system call issued to processing logic by an operating system. At block 805, processing logic creates a process key for a process. At block 810, processing logic encrypts the process key (e.g., using an OS key generated for a current session of an OS). At block 815, processing logic stores the encrypted version of the process key in an entry for the process in a process table. In one embodiment, processing logic provides the encrypted process key to an operating system, which may store the encrypted process key in the process table. In an alternative implementation, processing logic may maintain a separate data structure (e.g., a table) for the storage of process keys. In such an embodiment, the encrypted process key may be stored in this separate data structure rather than in the process table.

Figure 9:
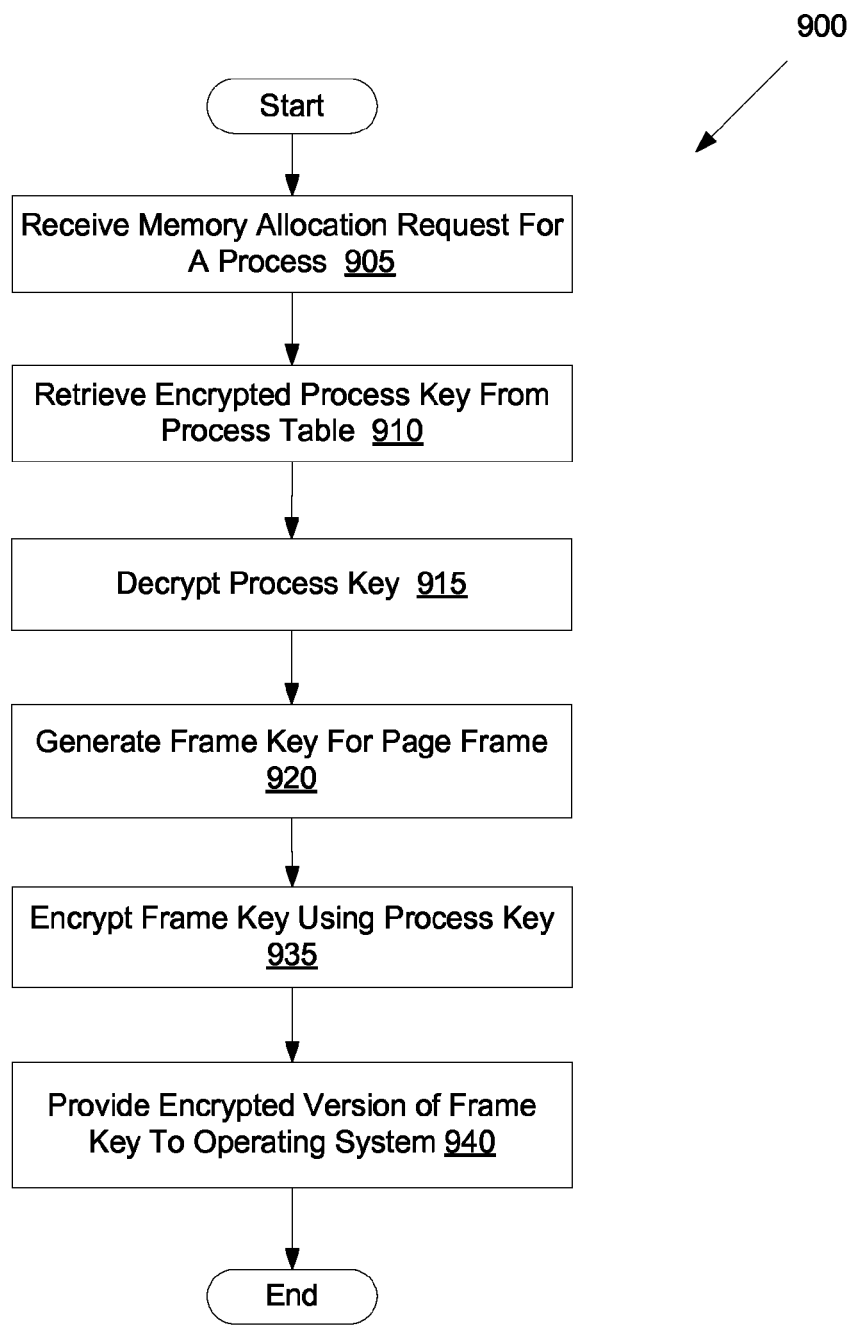
FIG. 9 is a flow diagram of one embodiment for a method of performing memory allocation.

FIG. 9 is a flow diagram of one embodiment for a method of performing memory allocation. Method 900 may perform operations that are illustrated in FIGS. 3A and 3B. At block 905 of method 900, processing logic receives a memory allocation request for a process. The memory allocation request may be a particular system call issued to processing logic by an operating system or by a process.

At block 910, processing logic retrieves an encrypted process key associated with the process from a process table (or other data structure). At block 915, processing logic decrypts the process key (e.g., using an OS key). At block 920, processing logic generates a frame key for a page frame of memory. At block 935, processing logic encrypts the frame key using the process key. At block 940, processing logic stores the encrypted version of the frame key in an entry for the page frame in a page table associated with the process. Alternatively, processing logic may maintain a separate data structure (e.g., a table) for the storage of frame keys. The separate data structure may store encrypted frame keys associated with a particular process, or may store encrypted frame keys associated with multiple (e.g., all) processes.

Figure 10:
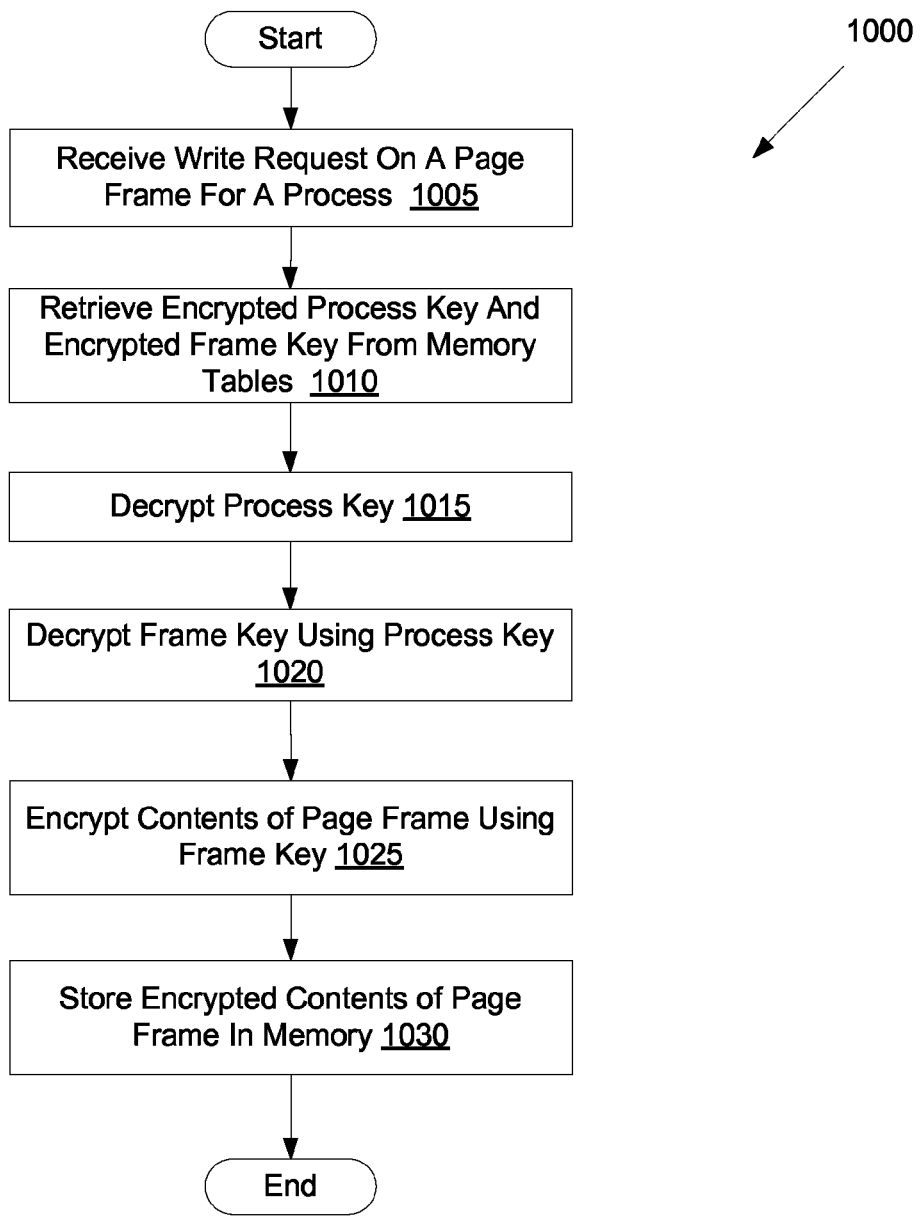
FIG. 10 is a flow diagram of one embodiment for a method of writing data to an allocated frame page.

FIG. 10 is a flow diagram of one embodiment for a method 1000 of writing data to an allocated frame page. Method 1000 may perform operations that are illustrated in FIGS. 3A and 3C. At block 1005 of method 1000, processing logic receives a write request. The write request may be a particular system call issued to processing logic by a process. The system call may or may not specify a page frame to write to.

At block 1010, processing logic retrieves an encrypted process key associated with the process from a process table (or other data structure). Processing logic additionally retrieves an encrypted frame key associated with a particular page frame to be written to from a page table of the process. At block 1015, processing logic decrypts the process key (e.g., using an OS key). At block 1020, processing logic decrypts the frame key using the process key. At block 1025, processing logic encrypts contents of the page frame using the frame key. At block 1030, processing logic stores the encrypted contents of the page frame at particular physical addresses in memory.

A method of reading a frame page may be similar to the illustrated method of writing to a frame page. To read a frame page, the actions of blocks 1005-1020 may be performed as shown for a write operation. At block 1025, rather than encrypting contents of a page frame using the frame key, processing logic may decrypt the contents of a page frame using the frame key. Then at block 1030, processing logic may return the decrypted contents of the page frame to a process rather than store the encrypted contents of the page frame.

Figure 11:
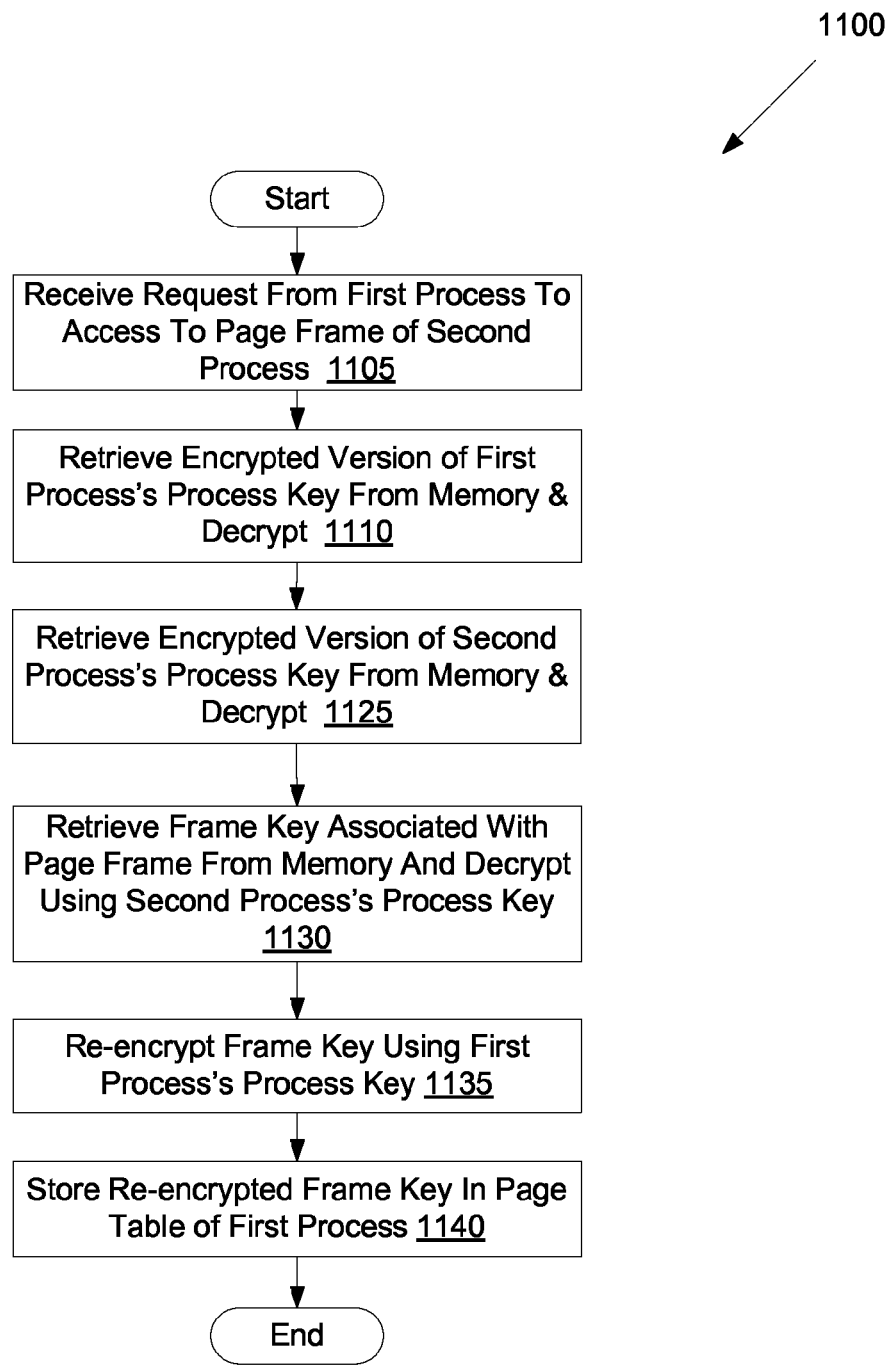
FIG. 11 is a flow diagram of one embodiment for a method of sharing a page frame between two processes.

FIG. 11 is a flow diagram of one embodiment for a method 1100 of sharing a page frame between two processes. Method 1100 may perform operations that are illustrated in FIGS. 5A and 5B. At block 1105 of method 1100, processing logic receives a request from a first process to access a page frame of a second process. Alternatively, the request may be received from an operating system. The sharing request may be a particular system call issued to processing logic by the process or operating system. The system call may specify a global name assigned to the page frame. Processing logic may use the global name to determine an identity of the second process and a page frame having the global name.

At block 1110, processing logic retrieves an encrypted first process key associated with a first process from memory (e.g., from a process table) and decrypts it. The first process may be the process that issued the memory sharing request. At block 1125, processing logic retrieves an encrypted second process key associated with a second process from memory (e.g., from a process table) and decrypts it. The second process may be a process to which the page frame is allocated.

At block 1130, processing logic retrieves an encrypted frame key associated with the identified page frame from memory (e.g., from a page table of the second process). Processing logic then decrypts the frame key using the second process key. At block 1135, processing logic re-encrypts the frame key using the .first process key. At block 1140, processing logic stores the re-encrypted frame key in memory (e.g., in a page table of the first process). The first process may then read and write to the page frame (e.g., using method 1000 of FIG. 10).

Figure 12:
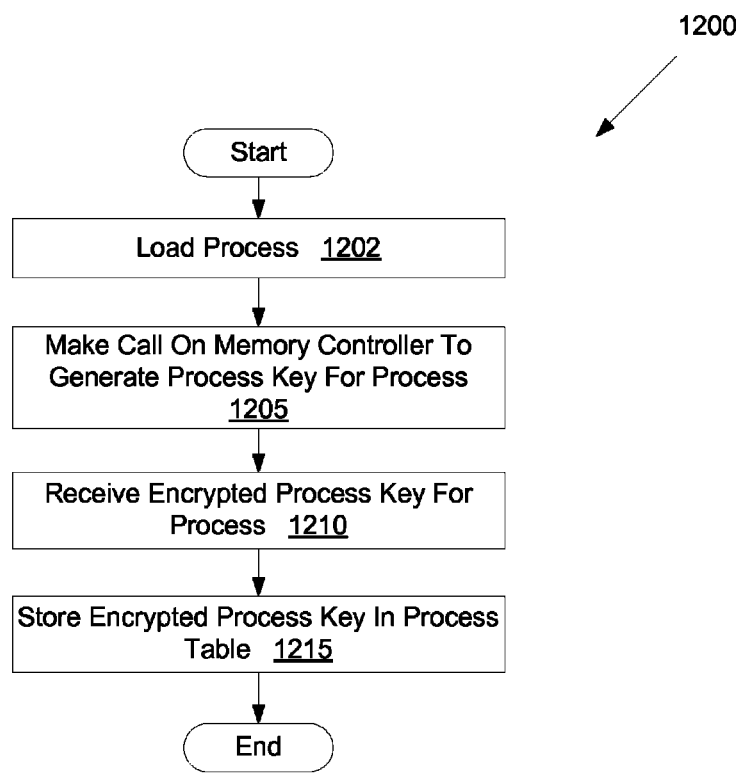
FIG. 12 is a flow diagram of one embodiment for a method of interfacing with a memory controller to create a process key.
Figure 13:
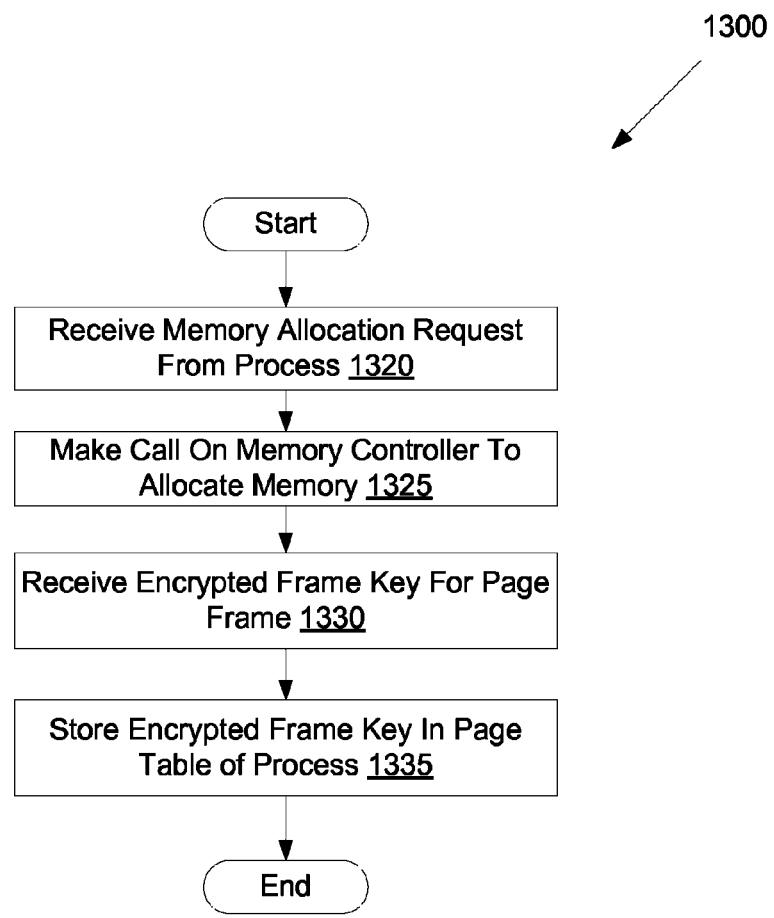
FIG. 13 is a flow diagram of one embodiment for a method of interfacing with a memory controller to satisfy a memory allocation request.
Figure 14:
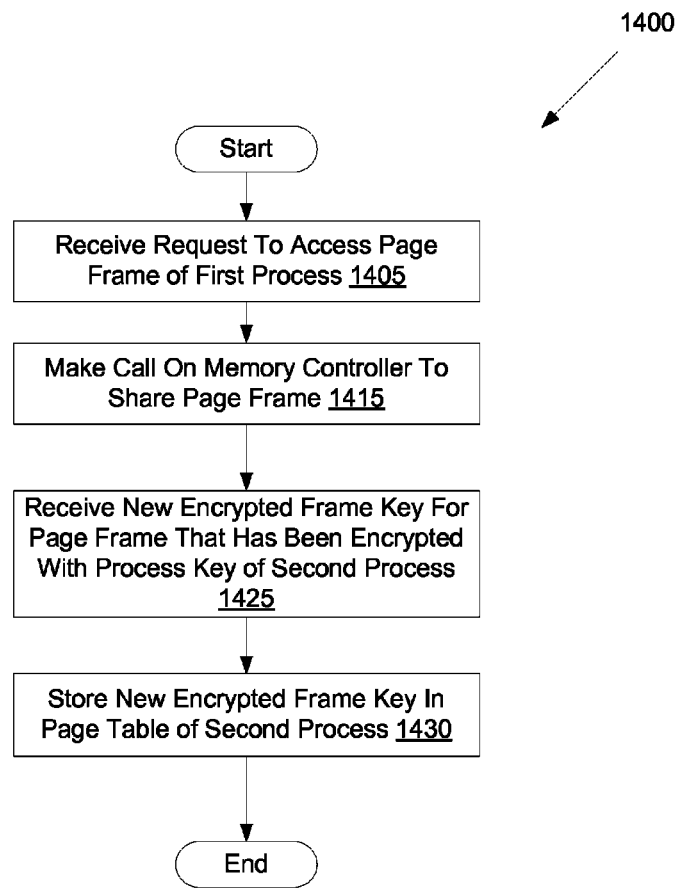
FIG. 14 is a flow diagram of one embodiment for a method of interfacing with a memory controller to enable a first process to access a page frame allocated to a second process.

FIGS. 12-14 are flow diagrams showing various methods for interfacing with a memory controller to perform operations associated with process specific encryption of memory. The methods may be performed by an operating system and/or a process running in a CPU.

FIG. 12 is a flow diagram of one embodiment for a method 1200 of interfacing with a memory controller to create a process key. At block 1202 of method 1200, processing logic loads a process. At block 1205, processing logic makes a call on a memory controller to generate a process key for the process. In one embodiment, processing logic issues a system call that causes the memory controller to perform method 800 of FIG. 8. At block 1210, processing logic receives an encrypted process key for the process, the encrypted process key having been created and encrypted by the memory controller. At block 1215, processing logic stores the encrypted process key in a process table.

FIG. 13 is a flow diagram of one embodiment for a method 1300 of interfacing with a memory controller to satisfy a memory allocation request. At block 1320 of method 1300, processing logic receives a memory allocation request from a process. At block 1325, processing logic makes a call on a memory controller to allocate memory for the process. In an alternative embodiment, processing logic may issue the call on the memory controller without first receives a memory allocation request from a process. For example, processing logic may automatically make the system call when the process is loaded. In one embodiment, processing logic issues a system call that causes the memory controller to perform method 900 of FIG. 9.

At block 1330, processing logic receives an encrypted frame key for a page frame that has been allocated to the process. Processing logic may also receive additional information about the page frame, such as one or more virtual addresses associated with the page frame and one or more physical addresses associated with the page frame. At block 1335, processing logic stores the encrypted frame key in a page table of the process. Processing logic may also store the physical addresses and corresponding virtual addresses in the page table.

FIG. 14 is a flow diagram of one embodiment for a method 1400 of interfacing with a memory controller to enable a first process to access a page frame allocated to a second process. At block 1405 of method 1400, processing logic receives a request to provide, to a second process, access to a page frame associated with a first process. At block 1405, processing logic makes a call on a memory controller to share the page frame. The call may include an identifier of the page frame, such as an assigned global identifier. In one embodiment, processing logic issues a system call that causes the memory controller to perform method 1100 of FIG. 11.

At block 1425, processing logic receives a new encrypted frame key for the page frame that has been encrypted with a process key of the second process. At block 1430, processing logic stores the new encrypted frame key in a page table of the second process. The method then ends.

Figure 15:
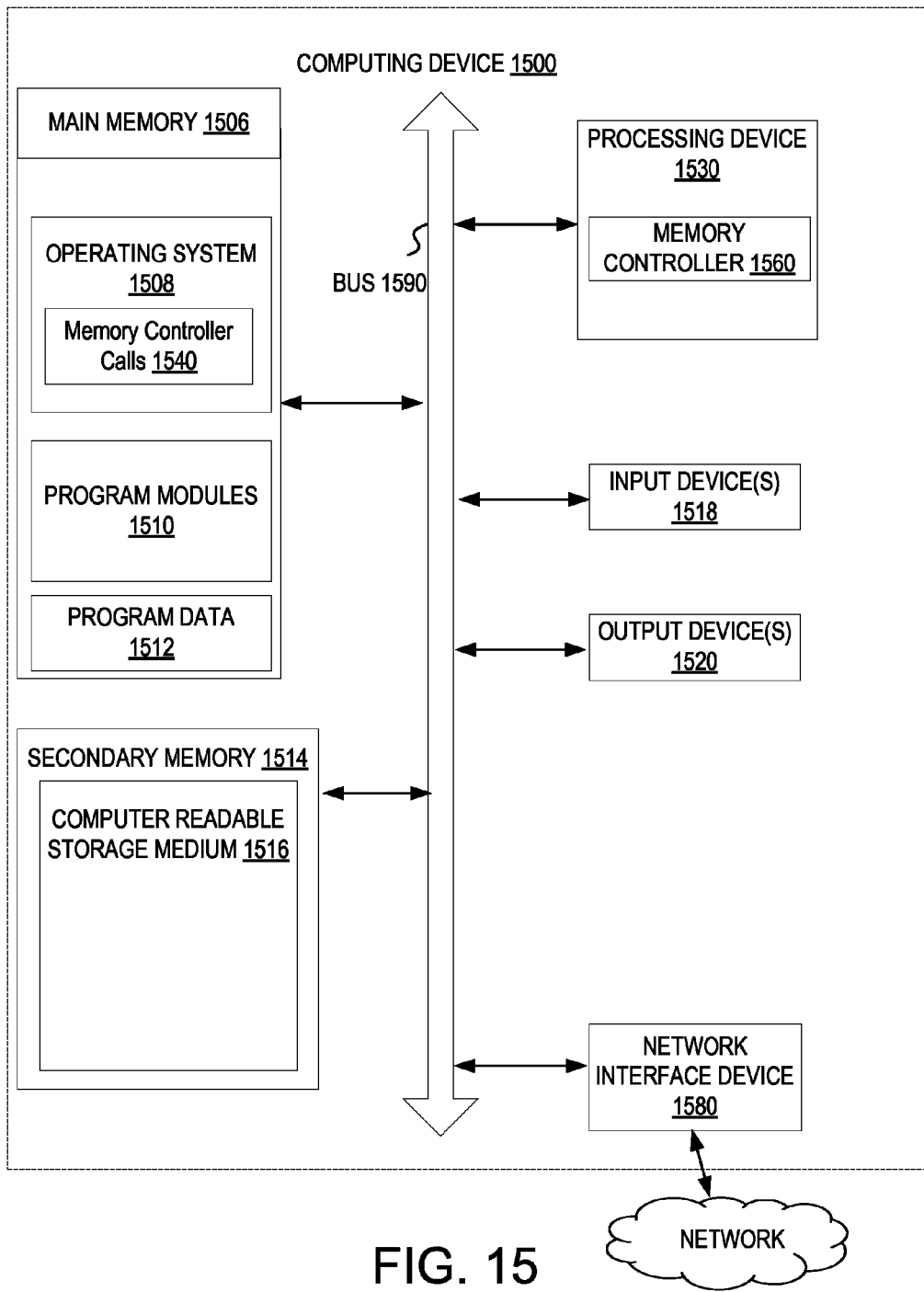
FIG. 15 is a diagram of one embodiment of a computing device according to one embodiment.

FIG. 15 is a diagram of one embodiment of a computing device 1500 according to one embodiment. The computing device 1500 may be connected (e.g., networked) to other machines in a LAN, an intranet, an extranet, or the Internet. The computing device 1500 can be a host in a cloud, a cloud provider system, a cloud controller, a server, a client, or any other machine. The computing device 1500 can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computing device 1500 includes a processing device 1530 (e.g., device 140 of FIG. 1), a main memory 1506 (e.g., memory 114 of FIG. 1), and a secondary memory 1514, which communicate with each other via a bus 1590. Processing device 1530 represents one or more general-purpose processors, such as a microprocessor, central processing unit, or the like. More particularly, the processing device 1530 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1530 may also be one or more special-purpose processing devices such as an application specific integrated circuit (ASIC), a field programmable gate array (FPGA), a digital signal processor (DSP), network processor, or the like. Processing device 1530 includes a memory controller 1560 as described above. The memory controller 1560 is a digital circuit that manages the flow of data going to and from the main memory 1506. The memory controller 1560 can be a separate integrated circuit, but can also be implemented on the die of a microprocessor. In one embodiment, memory controller 1560 corresponds to memory controller 710 of FIG. 7.

Main memory 1506 may include a read-only memory (ROM), flash memory, dynamic random access memory (DRAM), static random access memory (SRAM), etc. Main memory 1506 may contain instructions for an operating system 1508 that includes memory controller calls 1540, as well as instructions for program modules 1510. Main memory 1506 may additionally include program data 1512. Main memory 1506 may be arranged in page frames, as described above.

Secondary memory 1514 may include a non-transitory computer readable storage medium 1516 in the form of a drive unit, which may include fixed or removable computer-readable storage medium. Examples of computer readable storage media 1516 include, but are not limited to, any type of disk including floppy disks, optical disks, CD-ROMs and magnetic-optical disks, read-only memories (ROMs), random access memories (RAMs), erasable programmable read only memories (EPROMs), electrically erasable programmable read only memories (EEPROMs), magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The computing device 1500 may further include a network interface device 1580. The computing device 1500 also may include output devices 1520 such as a video display unit (e.g., a liquid crystal display (LCD)) connected to the computing device through a graphics port and graphics chipset. Computing device 1500 may also include an input device 1518 such as an alphanumeric input device (e.g., a keyboard), a cursor control device (e.g., a mouse).

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "generating," "deleting," "executing," "requesting," "communicating," or the like, refer to the actions and processes of a computing device that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of securing contents of a memory comprising:
   encrypting, by a memory controller, contents of a page frame of the memory based at least in part on a frame key associated with the page frame;
   generating, by the memory controller, a first encrypted version of the frame key based at least in part on a first process key associated with a first process, wherein the first encrypted version of the frame key is stored in a first memory table associated with the first process; and
   generating, by the memory controller, a second encrypted version of the frame key different from the first encrypted version of the frame key based at least in part on a second process key associated with a second process and different from the first process key, wherein the second encrypted version of the frame key is stored in a second memory table associated with the second process, the first process and the second process sharing access to the page frame using the first encrypted version of the frame key and the second encrypted version of the frame key, respectively.

2. The method of claim 1, wherein the first memory table is a first page table that maps virtual memory addresses in a first virtual address context of the first process to physical memory addresses, and wherein the second memory table is a second page table that maps virtual memory addresses in a second virtual address context of the second process to the physical memory addresses.

3. The method of claim 1, further comprising:
   receiving a memory allocation request for the first process from an operating system; and
   responsive to the memory allocation request, generating the frame key for the page frame.

4. The method of claim 1, further comprising:
   receiving a request to provide access to the page frame for the second process; and
   responsive to receiving the request:
   retrieving the first encrypted version of the frame key;
   decrypting the first encrypted version of the frame key using the first process key; and
   re-encrypting the frame key using the second process key to generate the second encrypted version of the frame key.

5. The method of claim 1, wherein unencrypted versions of the frame key, the first process key and the second process key are not revealed to the first process, to the second process or to an operating system.

6. The method of claim 1, wherein encrypting the contents of the page frame comprises:
   generating an encryption pad based at least in part on the frame key; and
   performing modular addition (XOR) operations between the encryption pad and the contents of the page frame.

7. A memory controller comprising:
   a hardware logic,
   the hardware logic comprising:
   first logic configured to encrypt and decrypt contents of a page frame based at least in part on a frame key associated with the page frame; second logic configured to generate a first encrypted version of the frame key based at least in part on a first process key associated with a first process; and third logic configured to generate a second encrypted version of the frame key, different from the first encrypted version of the frame key, based at least in part on a second process key different from the first process key and associated with a second process, the first process and the second process sharing access to the page frame using the first encrypted version of the frame key and the second encrypted version of the frame key, respectively.

8. The memory controller of claim 7, further comprising:
   fourth logic configured to generate the frame key responsive to receiving a memory allocation request for the first process from an operating system.

9. The memory controller of claim 7, wherein the third logic is further configured to:
   responsive to a request to provide access to the page frame for the second process, retrieve the first encrypted version of the frame key, decrypt the first encrypted version of the frame key using the first process key, and re-encrypt the frame key using the second process key to generate the second encrypted version of the frame key.

10. The memory controller of claim 7, further comprising:
    fourth logic configured to generate the first process key for the first process responsive to the first process being loaded and to generate the second process key for the second process responsive to the second process being loaded.

11. The memory controller of claim 7, wherein the memory controller is a component of an integrated circuit that comprises a central processing unit (CPU).

12. The memory controller of claim 7, wherein to encrypt the contents of the page frame, the first logic generates an encryption pad based at least in part on the frame key and performs a modular addition (XOR) operation between the encryption pad and contents of the page frame.

13. The memory controller of claim 7, further comprising:
fourth logic configured to store an unencrypted version of the frame key in a frame key cache associated with the memory controller while the first process is active; and
fifth logic configured to retrieve the unencrypted version of the frame key stored in the frame key cache for use by the first logic to encrypt contents of the page frame.

14. The memory controller of claim 7, further comprising:
fourth logic configured to store an unencrypted version of the first process key in a process key cache associated with the memory controller while the first process is active; and
fifth logic configured to retrieve the unencrypted version of the first process key stored in the process key cache for use by the second logic to generate the first encrypted version of the frame key.

15. The memory controller of claim 7, further comprising:
a data cache, wherein the memory controller is configured to store the frame key associated with the contents of the page frame stored in a data cache line in a frame key tag associated in the data cache line.

16. The memory controller of claim 15, further comprising:
a translation lookaside buffer (TLB);
wherein the memory controller comprises a fourth logic configured to:
check the TLB for a page frame address responsive to receiving a request for the contents of the page frame from a third process, and
responsive to a determination that the page frame is not in the TLB, generate a new frame key for the requested contents of the page frame based at least in part on the process key of the third process, determine that the requested contents of the page frame are stored in the data cache line, compare the stored frame key in the frame key tag of the cache associated with the data cache line to the new frame key, and generate a fault responsive to determining that the new frame key does not match the stored frame key.

17. The memory controller of claim 7, further comprising:
fourth logic configured to:
detect a peripheral device that has a direct memory access (DMA);
generate a device key for the peripheral device;
allocate an additional page frame to the peripheral device;
encrypt the additional page frame with an additional frame key associated with the additional page frame;
encrypt the additional frame key with the device key; and
store the encrypted device key and the encrypted frame key in one or more additional memory tables.

18. At least one non-transitory computer readable storage medium having instructions that, when executed by a processing device, cause the processing device to perform a method comprising:
making a first call to a memory controller by an operating system running on a processing device responsive to a memory allocation request from a first process, wherein the first call causes the memory controller to generate a frame key for a page frame and encrypt the frame key with a first process key associated with the first process;
receiving, by the operating system, an encrypted version of the frame key that is stored in a page table associated with the first process;
making a second call to the memory controller by the operating system responsive to a request from a second process to access the page frame, wherein the second call causes the memory controller to retrieve the encrypted version of the first process key and the encrypted version of the frame key, retrieve an encrypted version of a second process key different from the first process key and associated with the second process, decrypt the first process key and the second process key, decrypt the frame key using the first process key, and re-encrypt the frame key using the second process key; and
receiving a second encrypted version of the frame key that is stored in a second page table associated with the second process.

19. The non-transitory computer readable storage medium of claim 18, the method further comprising:
making a second call to the memory controller by the operating system responsive to a read request from the first process, wherein the second call causes the memory controller to retrieve the encrypted version of the first process key and the encrypted version of the frame key, decrypt the process key, decrypt the frame key using the first process key, and decrypt the contents of the page frame using the frame key.

* * * * *